US012567063B2

(12) United States Patent
Pettit et al.

(10) Patent No.: US 12,567,063 B2
(45) Date of Patent: Mar. 3, 2026

(54) PROPAGATING LOCKING SCRIPTS

(71) Applicant: nChain Licensing AG, Zug (CH)

(72) Inventors: Michaella Pettit, London (GB); Steven Patrick Coughlan, London (GB)

(73) Assignee: nChain Licensing AG, Zug (CH)

( * ) Notice: Subject to any disclaimer, the term of this patent is extended or adjusted under 35 U.S.C. 154(b) by 45 days.

(21) Appl. No.: 18/694,274

(22) PCT Filed: Aug. 30, 2022

(86) PCT No.: PCT/EP2022/074013
§ 371 (c)(1),
(2) Date: Mar. 21, 2024

(87) PCT Pub. No.: WO2023/052019
PCT Pub. Date: Apr. 6, 2023

(65) Prior Publication Data
US 2024/0394697 A1 Nov. 28, 2024

(30) Foreign Application Priority Data

Sep. 30, 2021 (GB) ..................................... 2113977

(51) Int. Cl.
*G06Q 20/38* (2012.01)
*G06Q 20/40* (2012.01)

(52) U.S. Cl.
CPC ......... *G06Q 20/389* (2013.01); *G06Q 20/401* (2013.01)

(58) Field of Classification Search
CPC .................. G06Q 20/389; G06F 21/62; G06F 2221/2141
See application file for complete search history.

(56) References Cited

U.S. PATENT DOCUMENTS 11,087,322 B2 * 8/2021 Vincent ............... G06Q 20/065
11,128,607 B2 * 9/2021 Wright .................. G06F 21/305
(Continued)

FOREIGN PATENT DOCUMENTS

CN 112102091 A 12/2020
GB 2598945 A 3/2022
(Continued)

OTHER PUBLICATIONS

Bistarelli et al., An analysis of non-standard bitcoin transactions, Nov. 30, 2018, IEEE, CVCBT 2018, pp. 93-96.*
(Continued)

*Primary Examiner* — Kambiz Zand
(74) *Attorney, Agent, or Firm* — Galvani Smith PLLC

(57) ABSTRACT

A method of enforcing a locking script to be propagated throughout a chain of blockchain transactions. The method comprises generating a primary transaction comprising a primary locking script configured to, when executed by an unlocking script of an auxiliary transaction, verify that the unlocking script comprises a message generated based on the auxiliary transaction, and verify, based on the message, that an output of the auxiliary transaction comprises an auxiliary locking script. The auxiliary locking script is configured to verify that an unlocking script of a second primary transaction comprises a message generated based on the second primary transaction, verify that the unlocking script of the second primary transaction comprises a data item comprising one or more locking scripts of the primary transaction, and verify, based on the message and the data item, that an output of the second primary transaction comprises the primary locking script.

20 Claims, 10 Drawing Sheets

(56)                References Cited

U.S. PATENT DOCUMENTS

| | | | | |
|---|---|---|---|---|
| 2019/0190719 | A1* | 6/2019 | van de Ruit | .......... H04L 9/3239 |
| 2019/0356481 | A1* | 11/2019 | Spector | ................. H04L 9/3247 |
| 2020/0099529 | A1 | 3/2020 | Chan et al. | |

FOREIGN PATENT DOCUMENTS

| | | |
|---|---|---|
| GB | 2607283 A | 12/2022 |
| WO | 2018215872 A1 | 11/2018 |
| WO | 2023036548 A1 | 3/2023 |

OTHER PUBLICATIONS

Extended European Search Report issued in European Application No. 25186859.2, mailed on Jul. 15, 2025, 7 pages.

Aros A., "Essential Requirements of the Ideal "Colored Coins" Solution," Bitcoin Files, 2020, 36 pages, Retrieved from the Internet URL: https://bitcoinfiles.org/t/44ba8c655af630ece973c9b11f25961 d182dd5ffebc59a7bb20879b2a6f1123f#essential-requirements-of-the-ideal--colored-coins--solution.

Bitcoin SV Wiki, "Bitcoin Transactions," retrieved from the Internet: https://wiki.bitcoinsv.io/index.php/Bitcoin_Transactions, on Aug. 17, 2020, 8 pages.

Damgård I.B., "A Design Principle for Hash Functions," CRYPTO 1989: Advances in Cryptology—CRYPTO' 89 Proceedings, vol. 435, pp. 416-427.

Secure Hash Standard (SHS), Federal Information Processing Standards Publication, Aug. 2015, 36 pages, Retrieved from the Internet URL: https://nvlpubs.nist.gov/nistpubs/FIPS/NIST.FIPS.180-4.pdf.

"How It Works," RUN, 75 pages, Retrieved from the Internet URL: https://run. network/docs/#how-it-works-overview.

Ilie D.L., et al., "Bitcoin Crypto-Bounties for Quantum Capable Adversaries," IACR, International Association for Cryptologic Research, vol. 20200218:090452, Feb. 14, 2020, pp. 1-16, Retrieved from the Internet: URL: http://eprint.iacr.org/2020/186.pdf.

International Search report and Written Opinion issued in international Application No. PCT/EP2022/074013, mailed on Dec. 15, 2022, 15 pages.

Jie J., et al., "Sensible Contract," Bitcell Technology Inc, Mar. 27, 2021, 10 pages, Retrieved from the Internet: URL: https://sensible-1257802845.cos.ap-nanjing.myqcloud.com/sensible-contract-v0.2. 0-en.pdf.

Scrypt., "Op-Push-Tx," Medium.com, 2020, 5 pages, Retrieved from the Internet URL: https://xiaohuiliu.medium. com/op-push-tx-3d3d279174c1.

Scrypt, "Peer-to-peer Tokens," Sep. 7, 2020, 4 pages, Retrieved from the Internet URL: https://xiaohuiliu.medium.com/peer-to-peer-tokens-6508986d9593.

Tokenized, "Documentation Menu, concepts, transactions," Tokenized Protocol, 7 pages, Retrieved from the Internet: URL: https://tokenized.com/docs/concepts/transactions.

Wagner L., "How SHA-256 Works Step-By-Step," 2020, 14 pages, Retrieved from the Internet URL: https://qvault.io/cryptography/how-sha-2-works-step-by-step-sha-256/.

* cited by examiner

Transaction
from Alice to Bob

Validated by running: Locking
script from output 203 of $Tx_0$,
together with Alice's unlocking
script from input 202 of $Tx_1$. This
checks that Alice's unlocking script
in $Tx_1$ meets the condition(s)
defined in the locking script of
previous transaction $Tx_0$.

Figure 9

| $Tx_1$ | | |
|---|---|---|
| Inputs | | Outputs |
| $TxID_0\|\|i$ | $sig_{P_I}, P_I$ | $s_A$ |
| | | $\mathrm{P2PKH}(P_A)$ |

Figure 10

| $Tx_1^A$ | | |
|---|---|---|
| *Inputs* | | *Outputs* |
| $TxID_1\|\|0$ | $m_1^A$ | $s$ |

Figure 11

| $Tx_2$ | | |
|---|---|---|
| Inputs | | Outputs |
| $TxID_1^A \| 0$ | $mid_1 + PPI_1,$ $Tx_1^A, m_2$ | $s_A$ |
| $TxID_1 \| 1$ | $sig_{P_A}, P_A$ | P2PKH($P_B$) OP_RETURN $<UTID>$ |

Figure 12

| $Tx_2^A$ | | |
|---|---|---|
| Inputs | | Outputs |
| $TxID_2 \| 0$ | $m_2^A$ | $s$ |

Figure 13

| $Tx_3$ | | |
|---|---|---|
| Inputs | | Outputs |
| $TxID_2^A \| 0$ | $mid_1 + PPI_1,$ $mid_2 + PPI_2, Tx_2^A,$ $m_3$ | $s_A$ |
| $TxID_2 \| 1$ | $sig_{P_B}, P_B$ | P2PKH($P_C$) OP_RETURN <$UTID$> |

Figure 14

| $Tx_n$ | | |
|---|---|---|
| Inputs | | Outputs |
| $TxID_{n-1}^A \| 0$ | $mid_{n-2} + PPI_{n-2},$ $mid_{n-1} + PPI_{n-1},$ $Tx_{n-1}^A, m_n$ | $s_A$ |
| $TxID_{n-1} \| 1$ | $sig_{P_{N-1}}, P_{N-1}$ | P2PKH($P_N$) OP_RETURN <$UTID$> |

Figure 15

| $Tx_{n-1}^{A}$ | | |
|---|---|---|
| Inputs | | Outputs |
| $TxID_n \| 0$ | $m_{n-1}^{A}$ | $\delta$ |

PROPAGATING LOCKING SCRIPTS

CROSS REFERENCE TO RELATED APPLICATIONS

This application is the U.S. National Stage of International Application No. PCT/EP2022/074013 filed on Aug. 30, 2022, which claims the benefit of United Kingdom Patent Application No. 2113977.9, filed on Sep. 30, 2021, the contents of which are incorporated herein by reference in their entireties.

TECHNICAL FIELD

The present disclosure relates to a method of enforcing a locking script to be propagated throughout a chain of blockchain transactions and to a method of verifying that a locking script has been enforced throughout a chain of blockchain transactions.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at some nodes, and the publication of blocks can be achieved through the publication of mere block headers.

The transactions in the blockchain may be used for one or more of the following purposes: to convey a digital asset (i.e. a number of digital tokens), to order a set of entries in a virtualised ledger or registry, to receive and process timestamp entries, and/or to time-order index pointers. A blockchain can also be exploited in order to layer additional functionality on top of the blockchain. For example blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

SUMMARY

It is generally known that conditions can be enforced on the fields of a spending transaction, i.e. a transaction that spends (unlocks, assigns, transfers, etc.) an output of a previous transaction. For instance, the previous transaction may include a locking script that imposes a condition on one or more outputs of the spending transaction. Note that the term "spending transaction" is used in the art to mean a current transaction that unlocks at least one output of at least one previous transaction, and does not necessarily mean that the current transaction is related to a financial transaction.

One reason for wanting to enforce conditions on the fields of a spending transaction is to ensure that the spending transaction has an output that includes the same locking script as the previous transaction. In that way, one can ensure that the spending transaction enforces the same conditions on the next spending transaction. That is, the n−1th transaction includes a locking script that forces the nth transaction to include the same locking script, which therefore forces the n+1th transaction to include the same locking script. In this way, a chain of transactions is created whereby each transaction includes the same locking script. This may be used in the context of digital tokens that, for example, represent ownership of real world objects, or even objects in a virtual world. This is advantageous as it means that each transfer of the token is subject to the same rules.

Previous attempts at forcing a chain of transactions to include the same locking script suffer from at least one of the following problems. First, some attempts require a verifier to trace back to the first transaction in the chain (e.g. an "issuance transaction") to ensure that the first transaction was created correctly (e.g. by a particular authority, such as a token issuer) or that the locking script included in the most recent transaction is the same as the locking script that was included in the first transaction and every other transaction in the chain. This consumes the verifier's resources (both in terms of computational resources, time and effort) in validating the latest transaction in the chain. Secondly, some attempts require a third party to be involved in the creation and/or validation of the next transaction in the chain (e.g. the transferring of a token) to ensure that the next transaction is created correctly. This introduces a security weakness by relying on a third party, and increases the number of parties that must interact with one another, which reduces efficiency. Thirdly, some attempts at forcing a chain of transactions to include the same locking script require the latest transaction in the chain to include each previous transaction in the chain, thus introducing a transaction bloat problem. This is problematic for both the transmission and storage of transactions. Fourthly, some attempts are susceptible to replay attacks, which are discussed below.

It would therefore be desirable to implement a mechanism which enforces a chain of transactions to include the same locking script which solves one, some or all of the identified problems.

According to one aspect disclosed herein, there is provided a computer-implemented method of enforcing a locking script to be propagated throughout a chain of blockchain transactions. The method is performed by a first party and comprises generating a first primary transaction comprising a first output, wherein the first output comprises a primary locking script, wherein the primary locking script is configured to, when executed by a first unlocking script of a first auxiliary transaction, i) verify that the first unlocking script comprises a first message generated based on the first auxiliary transaction, and ii) verify, based on the first message, that a first output of the first auxiliary transaction comprises an auxiliary locking script, wherein the auxiliary locking script is configured to, when executed by a first unlocking script of a second primary transaction, i) verify that the first unlocking script of the second primary transaction comprises a second message generated based on the second primary transaction, ii) verify that the first unlocking script of the second primary transaction comprises a first data item comprising one or more locking scripts of the first primary transaction, and iii) verify, based on the second message and the first data item, that a first output of the second primary transaction comprises the primary locking script.

The term "primary transaction" is used herein to refer to a transaction in a chain of transactions that is forced to include the same locking script, which is referred to as the "primary locking script". For instance, the primary locking script may include data related to a token, such as the deed to a property. The term "auxiliary transaction" is used to refer to a transaction that is used to enforce conditions on the primary transactions, namely that the primary transaction must include the primary locking script. These conditions are enforced, at least in part, by an "auxiliary locking script" that is included in each auxiliary transaction.

The auxiliary transaction acts as a bridge between consecutive primary transactions. That is, a first auxiliary transaction spends (i.e. unlocks) an output of a first primary transaction and a second primary transaction spends (i.e. unlocks) an output of the first auxiliary transaction. The primary locking script imposes conditions on the next auxiliary transaction. For instance, the primary locking script forces the next auxiliary transaction to include the auxiliary locking script. The auxiliary locking script imposes conditions on the next primary transaction. For instance, the auxiliary locking script forces the next primary transaction to include the primary locking script.

In some examples, the first primary transaction is the initial primary transaction in the chain, i.e. the first transaction to include the primary locking script. This may be created by, for example, a token issuer who issues a token. In other examples, the first primary transaction is not the initial primary transaction, i.e. there is at least one other previous primary transaction in the chain of transactions that includes the primary locking script. For instance, in this example the first primary transaction may be created by a transferor of the token.

According to another aspect disclosed herein, there is provided a computer-implemented method of verifying that a locking script has been enforced throughout a chain of blockchain transactions. The method is performed by a second party and comprises obtaining a second primary transaction, wherein the second primary transaction comprises a first input and a first output, wherein the first input comprises a second message generated based on the second primary transaction, a first auxiliary transaction comprising a first input that unlocks a first output of a first primary transaction, and a first data item comprising one or more locking scripts of the first primary transaction, wherein the first output of the first primary transaction comprises a primary locking script and a first output of the first auxiliary transaction comprises an auxiliary locking script, and wherein the first output of the second primary transaction comprises the primary locking script. The method further comprises verifying that a first primary transaction has been recorded on the blockchain and verifying that the primary locking script of the first primary transaction is configured to, when executed by a first unlocking script of the first auxiliary transaction, i) verify that the first unlocking script comprises a first message generated based on the first auxiliary transaction, and ii) verify, based on the first message, that a first output of the first auxiliary transaction comprises an auxiliary locking script, wherein the auxiliary locking script is configured to, when executed by a first unlocking script of the second primary transaction, i) verify that the first unlocking script comprises the second message, ii) verify that the first unlocking script comprises the first data item, and iii) verify, based on the second message and the first data item, that the first output of the second primary transaction comprises the primary locking script, thereby verifying that the primary locking script has been enforced throughout the first and second primary transactions.

The second party obtains (e.g. receives from the first party) the second primary transaction. The second primary transaction may be the primary transaction that appears second in the chain of transactions, or it may be a later transaction. That is, the second transaction may in general by the nth transaction in the chain of transactions. The second primary transaction includes, in an output, the primary locking script. The second primary transaction has an input that spends an output of a first auxiliary transaction, and thus satisfies the requirements of the auxiliary locking script. The first auxiliary transaction spends an output of a first primary transaction, and thus satisfies the requirements of the primary locking script. Thus if the first auxiliary transaction successfully unlocks the primary locking script of the first primary transaction, and the second primary transaction successfully unlocks the auxiliary locking script of the first auxiliary transaction, then the second primary transaction must include the primary locking script. This is dependent on the correct primary locking script being included in the chain of transactions.

The second party verifies that the first primary transaction has been recorded on the blockchain and is thus a valid transaction. The second party also verifies that the primary locking script is correct, e.g. that it forces the auxiliary transaction to include the auxiliary locking script, which then forces the next primary transaction to include the same primary locking script. For instance, this may be achieved by ensuring that the primary locking script includes a hash puzzle based on a hash of the auxiliary locking script. In this case, the hash puzzle can only be solved (and therefore the primary locking script unlocked) if the auxiliary transaction includes the auxiliary locking script.

The second party may then generate a second auxiliary transaction and a third primary transaction. The second auxiliary transaction is needed to unlock the primary locking script of the second primary transaction. The second auxiliary transaction also forces the third primary transaction to include the primary locking script. Each next transaction in the chain is forced to include the primary locking script in the same way.

Note that in effect, two locking scripts are forced to be propagated. The primary locking script is forced to be included in an output of each primary transaction, and the auxiliary locking script is forced to be included in an output of each auxiliary transaction.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

1. Example System Overview

Figure 1:
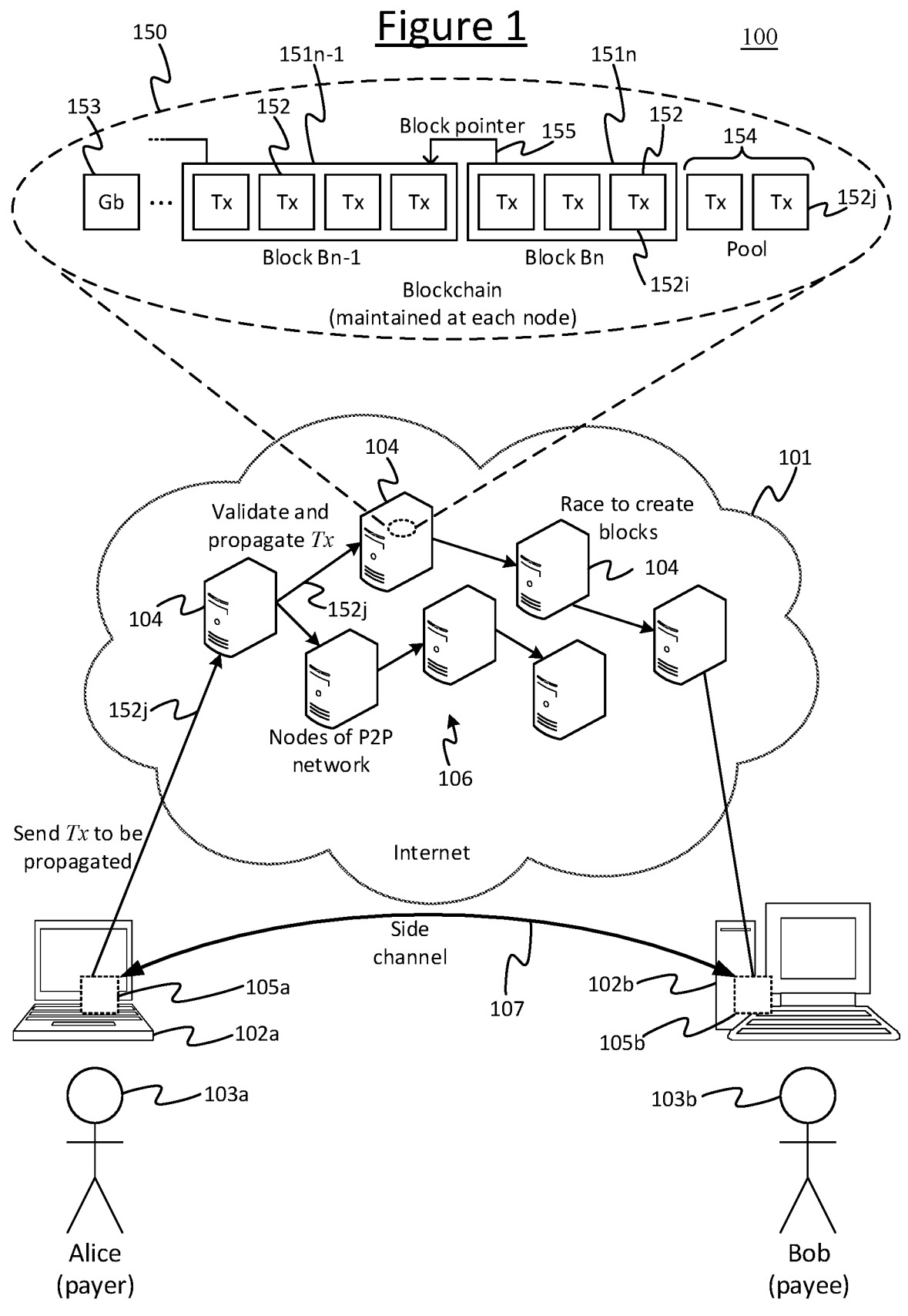
FIG. 1 is a schematic block diagram of a system for implementing a blockchain.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152_j_, the (or each) input comprises a pointer referencing the output of a preceding transaction 152_i_ in the sequence of transactions, specifying that this output is to be redeemed or "spent" in the present transaction 152_j_. Spending or redeeming does not necessarily imply transfer of a financial asset, though that is certainly one common application. More generally spending could be described as consuming the output, or assigning it to one or more outputs in another, onward transaction. In general, the preceding transaction could be any transaction in the ordered set 154 or any block 151. The preceding transaction 152_i_ need not necessarily exist at the time the present transaction 152_j_ is created or even sent to the network 106, though the preceding transaction 152_i_ will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152_i_, 152_j_ be created or sent out-of-order (see discussion below on orphan transactions). The preceding transaction 152_i_ could equally be called the antecedent or predecessor transaction.

The input of the present transaction 152_j_ also comprises the input authorisation, for example the signature of the user 103_a_ to whom the output of the preceding transaction 152_i_ is locked. In turn, the output of the present transaction 152_j_ can be cryptographically locked to a new user or entity 103_b_. The present transaction 152_j_ can thus transfer the amount defined in the input of the preceding transaction 152_i_ to the new user or entity 103_b_ as defined in the output of the present transaction 152_j_. In some cases a transaction 152 may have multiple outputs to split the input amount between multiple users or entities (one of whom could be the original user or entity 103_a_ in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152_j_ (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152_j_ could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152_j_ matches the expected signature, which depends on the previous transaction 152_i_ in an ordered sequence of transactions 152. In such an output-based transaction protocol, this may comprise checking that the cryptographic signature or other authorisation of the party 103 included in the input of the new transaction 152_j_ matches a condition defined in the output of the preceding transaction 152_i_ which the new transaction spends (or "assigns"), wherein this condition typically comprises at least checking that the cryptographic signature or other authorisation in the input of the new transaction 152_j_ unlocks the output of the previous transaction 152_i_ to which the input of the new transaction is linked to. The condition may be at least partially defined by a script included in the output of the preceding transaction 152_i_. Alternatively it could simply be fixed by the blockchain node protocol alone, or it could be due to a combination of these. Either way, if the new transaction 152_j_ is valid, the blockchain node 104 forwards it to one or more other blockchain nodes 104 in the blockchain network 106. These other blockchain nodes 104 apply the same test according to the same blockchain node protocol, and so forward the new transaction 152_j_ on to one or more further nodes 104, and so forth. In this way the new transaction is propagated throughout the network of blockchain nodes 104.

In an output-based model, the definition of whether a given output (e.g. UTXO) is assigned (or "spent") is whether it has yet been validly redeemed by the input of another, onward transaction 152_j_ according to the blockchain node protocol. Another condition for a transaction to be valid is that the output of the preceding transaction 152_i_ which it attempts to redeem has not already been redeemed by another transaction. Again if not valid, the transaction 152_j_ will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151n pointing back to the previously created block 151n-1 in the chain. The significant amount of effort, for example in the form of hash, required to create a proof-of-work solution signals the intent of the first node 104 to follow the rules of the blockchain protocol. Such rules include not accepting a transaction as valid if it spends or assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151n and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151n. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151n in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152j, it handles it in accordance with the blockchain node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152j passes the test for being deemed valid (i.e. on condition that it is "validated"), any blockchain node 104 that receives the transaction 152j will add the new validated transaction 152 to the ordered set of transactions 154 maintained at that blockchain node 104. Further, any blockchain node 104 that receives the transaction 152j will propagate the validated transaction 152 onward to one or more other blockchain nodes 104 in the network 106. Since each blockchain node 104 applies the same protocol, then assuming the transaction 152j is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

2. UTXO-Based Model

Figure 2:
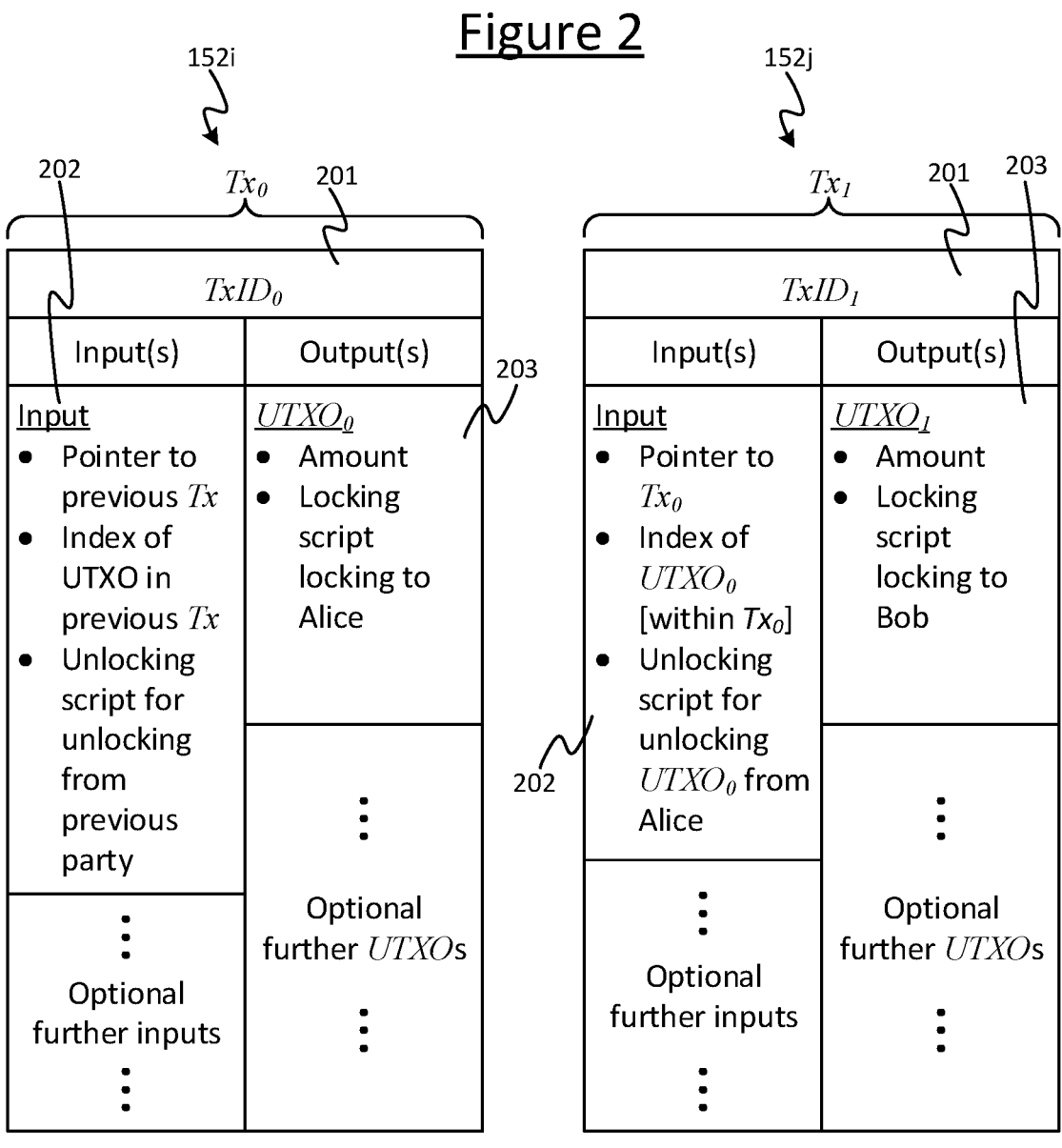
FIG. 2 schematically illustrates some examples of transactions which may be recorded in a blockchain, FIG. 3 schematically illustrates an example system for propagating locking scripts.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103*a* wishes to create a transaction 152*j* transferring an amount of the digital asset in question to Bob 103*b*. In FIG. 2 Alice's new transaction 152*j* is labelled "$Tx_1$". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (akabt0UJ5b1 scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned (or spent) by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_ . . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

3. Side Channel

As shown in FIG. 1, the client application on each of Alice and Bob's computer equipment 102a, 120b, respectively, may comprise additional communication functionality. This additional functionality enables Alice 103a to establish a separate side channel 107 with Bob 103b (at the instigation of either party or a third party). The side channel 107 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102a, 102b. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

4. Enforcing the Propagation of a Locking Script

Figure 3:
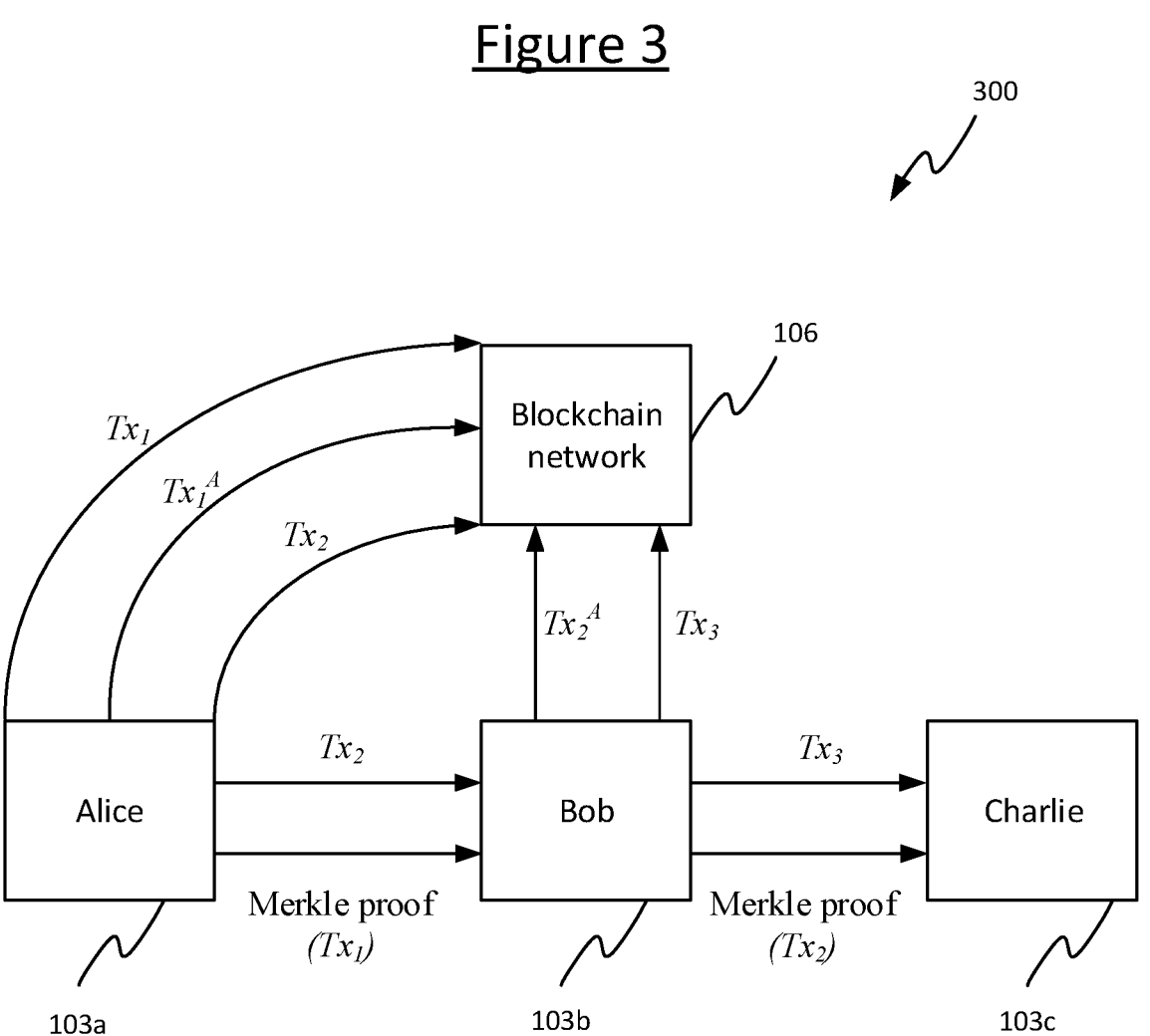

FIG. 3 illustrates an example system 300 for enforcing the propagation of a locking script, i.e. forcing each transaction in a chain of transactions to include the same locking script. The system 300 comprises a first party (e.g. Alice 103a) and a second party (e.g. Bob 103b). The system 300 may also comprise one or more additional parties, e.g. Charlie 103c. The system 300 also comprises one or more blockchain nodes 104 of a blockchain network 106. Whilst the first party and second party are referred to as Alice 103a and Bob 103b throughout the following description, it should be noted that this is merely for convenience. That is, the first party and second party need not necessarily be configured to perform some or all of the actions described above as being performed by Alice 103a and Bob 103b with reference to FIGS. 1 and 2, though that is of course an option. More generally, both the first party and second party may be configured to perform some or all of the actions described above as being performed by Alice 103a and/or Bob 103b with reference to FIGS. 1 and 2. It will be appreciated that any operation described as being performed by Alice 103a, Bob 103b, or Charlie 103c is performed by their respective computing equipment.

Embodiments of the present invention may be used to ensure that a locking script is propagated throughout a chain of blockchain transactions. In general, the protocol relies on two types of transactions: primary transactions and auxiliary transactions. The primary transactions each comprise a respective primary locking script which enforces conditions on a respective auxiliary transaction that attempts to unlock the respective primary locking script. Each primary locking script is the same, i.e. it takes the same format, contains the same data, and implements the same functions. The auxiliary transactions each comprise a respective auxiliary locking script which enforces conditions on a respective primary transaction that attempts to unlock the respective auxiliary locking script. Each auxiliary locking script is the same.

The first party Alice 103a may be responsible for generating an issuance transaction. The issuance transaction is the initial primary transaction in the chain of transactions. The issuance transaction may also be referred to as the first primary transaction. In examples where the primary transaction contains token-related data, Alice 103a may be the issuer of the token. In other examples, a different party may initiate the token chain.

The first primary transaction comprises one or more inputs and one or more outputs. For instance, an input of the primary transaction may be used to unlock an output of one of Alice's previous transactions, and hence may include the data required to do so, e.g. Alice's signature and public key. An output (e.g. the first output) of the first primary transaction includes the primary locking script, i.e. an instance of the same primary locking script that is to be propagated throughout future transactions. Another output (e.g. the second output) of the first primary transaction may specify a spending condition, e.g. it may be locked to a public key owned by Alice 103a or a different party. For example, the second output may comprise a pay-to-public-key-hash (P2PKH) output.

The primary locking script is configured to enforce several conditions on the transaction that attempts to unlock the primary locking script, which in this case is a first auxiliary transaction. One of the conditions enforced on the auxiliary transaction is that an unlocking script of the first auxiliary transaction must contain a first message that is based on the first auxiliary transaction itself. That is, the first message is based on one, some or all of the fields of the first auxiliary transaction. Some of the fields may be in their raw form and some may be obfuscated, e.g. hashed. One technique for forcing an unlocking script to contain such a message is known in the art as PUSHTX, which is a pseudo-opcode, i.e. a combination of opcodes configured to perform a particular function. PUSHTX is described here: xiaohuiliu.medium-.com/op-push-tx-3d3d279174c1. Another example is described in UK patent application GB2112930.9. Forcing the unlocking script to contain the first message allows certain checks to be made on the first auxiliary transaction. This message is sometimes referred to as a sighash preimage, as it is the preimage which is hashed before signing as part of the blockchain signature protocol. Put another way, forcing the unlocking script to contain the first message allows certain conditions to be enforced on the first auxiliary transaction. One condition that is enforced is that an output (e.g. the first output) of the first auxiliary transaction contains an auxiliary locking script (described below).

As an example of how to enforce this condition, the primary locking script may comprise a sub-script configured to implement a hash puzzle based on a hash of the auxiliary locking script. That is, the hash puzzle comprises a hash of the auxiliary locking script and is configured such that it can only be solved, and thus the sub-script unlocked, if the preimage to the hash is provided, whereby the preimage is the auxiliary locking script. The primary locking script may therefore be configured to extract a locking script (e.g. the first locking script) from the first message, hash the extracted locking script, and verify that it hashes to the hash of the auxiliary locking script that is included as part of the primary locking script.

Alice 103a may create the first auxiliary transaction, or it may be generated by a different party. The first auxiliary transaction comprises, as mentioned above, an input comprising the first message and an output comprising the auxiliary locking script. The auxiliary locking script is configured to enforce several conditions on the transaction that attempts to unlock the auxiliary locking script, which in this case is a second primary transaction. One of the conditions enforced on the second primary transaction is that an unlocking script (e.g. a first unlocking script) of the second primary transaction must contain a second message that is based on the second primary transaction. That is, the second message is based on one, some or all of the fields of the second primary transaction. Some of the fields may be in their raw form and some may be obfuscated, e.g. hashed. Another condition that is enforced on the second primary transaction is that the unlocking script must also contain a data item comprising one, some or each locking script of the first primary transaction, and thus the first data item must contain the primary locking script. That is, the first data item must include at least the primary locking script. In some examples, the first data item must also include the second locking script of the first primary transaction, which is discussed below. Using the second message and the first data item, the auxiliary locking script forces the second primary transaction to include, in an output (e.g. a first output), the primary locking script. The primary locking script is therefore propagated between primary transactions. Since the primary locking script forces the auxiliary transaction to contain the auxiliary locking script, the auxiliary locking script is also propagated between auxiliary transactions. Any data (e.g. token related data) that is included as part of the primary locking script or auxiliary locking script is therefore propagated between primary transaction or auxiliary transactions, respectively.

As mentioned above, the first primary transaction may include a second output. The auxiliary locking script may be configured to force the second output of the first primary transaction to be spent by an input of the second primary transaction. That is, in these examples, the second output of the first primary locking script and the first output of the first auxiliary transaction must be spent by respective inputs of the second primary transaction, and not separate transactions.

One option for enforcing this condition is to force the first unlocking script of the second primary transaction to include the first auxiliary transaction. That is, a second data item is included in the unlocking script of the second primary transaction, where that second data item comprises the first auxiliary transaction, e.g. in a serialised form. The auxiliary locking script is configured to extract, from the second message, a respective transaction identifier of the output that is spent by the first input of the second primary transaction. Similarly, the auxiliary locking script is configured to extract, from the second data item, a respective transaction identifier of the output that is spent by the first input of the first auxiliary transaction. The auxiliary transaction is configured to force the extracted transaction identifiers to be the same.

In these examples, the second primary transaction includes a second input configured to unlock the second output of the first primary transaction, thus creating a linked chain of transactions. Note that the transactions may be linked in this way without the above described enforcement of the output of the first primary transaction and the output of the first auxiliary transaction being spent by the same second primary transaction. However, there are benefits (discussed below) to having this condition enforced in-script.

In some examples, an additional verification may be performed by the auxiliary locking script to verify that the first data item (i.e. the data item comprising the locking scripts of the first primary transaction) is correct. The first primary transaction has, or is at least associated with, a transaction identifier which is generated by hashing the transaction with a hash function, e.g. SHA256 or SHA512. Any suitable hash function may be used. The first unlocking script of the second primary transaction may include a third data item that comprises a midstate of applying the hash function to the first primary transaction. The skilled person will be familiar with midstates per se. In general, when data is hashed (e.g. with a SHA-based hash function), the data is split into blocks. A series of computations are performed using a first set of the blocks to produce a first midstate. A series of computations are performed using the first midstate and a second set of the blocks to produce a second midstate, and so on, until all of the blocks have been operated on to give the hash digest. In other words, a hash function does not involve a single operation. Rather, the input to a hash function is broken up into blocks (e.g. 64 bytes for SHA256), and the blocks are processed in order. The midstate is the internal state after processing one or more of the blocks. A midstate is produced after each block is processed. The midstate computed after processing the nth block is dependent on all previous blocks, but not subsequent blocks. An example of the inner workings of the SHA256 hash function can be found at qvault.io/cryptography/how-sha-2-works-step-by-step-sha-256/.

The present disclosure recognises that by providing a midstate generated by applying the hash function to a first part of the first primary transaction, not including the locking scripts, then the computation can be continued in-script using the first data item (i.e. the locking scripts) to produce a candidate transaction identifier of the first primary transaction. If the candidate transaction identifier matches the actual transaction identifier of the first primary transaction, then the first data item must include the actual locking scripts (and therefore the primary locking script) of the first primary transaction.

The auxiliary locking script may also be configured to force the second primary transaction to include the transaction identifier of the initial primary transaction in the chain. For instance, the second primary transaction may be required to include the transaction identifier in a second output. If the first primary transaction is the initial transaction in the chain, then each subsequent transaction, including the second primary transaction, is forced to include the transaction identifier of the first primary transaction. In these examples, the initial primary transaction (e.g. the first primary transaction) will not include its own transaction identifier as it is based on the whole of the initial primary transaction. Each subsequent primary transaction can be forced to include the transaction identifier of the initial primary transaction.

The second primary transaction may be generated by Alice 103a or a different party. As discussed above, the second primary transaction comprises a first input that spends the first output of the first auxiliary transaction, and may comprise a second input that spends the second output of the first primary transaction. The second primary transaction also comprises a first input that comprises the primary locking script. The second primary transaction may comprise a second output, e.g. to be unlocked by a second output of the next primary transaction. The second output may be locked to a public key of the second party, Bob 103b. The second output may include the transaction identifier of the initial primary transaction.

Alice 103a is configured to cause the first primary transaction to be submitted to one or more blockchain nodes 104. For example, Alice 103a herself may send the first primary transaction to the blockchain network 106, or she may send the first primary transaction to the blockchain network via an intermediary, e.g. Bob 103b. Similarly, Alice 103a may be configured to cause the first auxiliary transaction and/or the second primary transaction to be submitted to one or more blockchain nodes 104.

In some examples, Alice 103a may send the second primary transaction to Bob 103b. Alice 130a may also send a Merkle proof to Bob 103b, where the Merkle proof may be used to verify that the first primary transaction has been recorded on the blockchain 150.

So far, the first primary transaction has mainly been described as the initial primary transaction. However, the first primary transaction may in general be the nth primary transaction, in which case the second primary transaction described above would be the n+1th primary transaction. Similarly, in this example there exists an n−1th primary transaction. In this case, Alice 130a may or may not be responsible for generating the issuance transaction.

Continuing with this example, the first primary transaction may comprise a first input that references a first output of a previous auxiliary transaction. Like the first auxiliary transaction, the first output of the previous auxiliary transaction contains the auxiliary locking script (i.e. an instance of the same exact auxiliary script). The previous auxiliary transaction also has an input which references a first output of a previous primary transaction. The first output of the previous primary transaction contains the primary locking script. In this example, the previous primary transaction may be the initial primary transaction, or a different primary transaction in the chain of primary transactions.

The auxiliary locking script of the previous auxiliary transaction is configured to perform the checks described above (i.e. enforce the same conditions) on the first primary transaction as the auxiliary locking script of the first auxiliary transaction does for the second primary transaction. E.g. force the first primary transaction to include the primary locking script.

In these examples, when the second primary transaction has a parent primary transaction (i.e. the first primary transaction) and a grandparent primary transaction (i.e. the previous primary transaction), the auxiliary locking script of the first primary transaction is configured to force the unlocking script of the second primary transaction to include a fourth data item comprising one, some, or each locking script of the previous primary transaction. This will include the primary locking script. Using the second message that is included in the unlocking script of the second primary transaction (i.e. the message generated based on the second primary transaction) and the fourth data item, the auxiliary locking script verifies that the primary locking script included in the first output of the second primary transaction is the same as the primary locking script included in the previous primary transaction. This verifies that the same primary locking script is passed from one primary transaction to the next primary transaction, and to the next primary transaction. In other words, it proves that the primary locking script of the previous primary transaction has been executed.

A midstate generated by applying the hash function (e.g. SHA256) to the previous primary transaction may be used to verify that the fourth data item is correct. That is, an additional verification may be performed by the auxiliary locking script to verify that fourth data item (i.e. the data item comprising the locking scripts of the previous primary transaction) is correct. The previous primary transaction has, or is at least associated with, a transaction identifier which is generated by hashing the transaction with a hash function, e.g. SHA256. The first unlocking script of the second primary transaction may include the fifth data item that comprises a midstate of applying the hash function to the previous primary transaction. The auxiliary locking script may generate a candidate transaction identifier of the previous primary transaction using the fourth data item and the firth data item. If the candidate transaction identifier matches the actual transaction identifier of the previous primary transaction, then the fourth data item must include the actual locking scripts (and therefore the primary locking script) of the previous primary transaction.

The first primary transaction may include a second input that spends a second output of the previous primary transaction. The condition may be enforced by the auxiliary locking script included in the previous auxiliary locking script.

The previous primary transaction and/or previous auxiliary transaction may be generated by Alice 103*a*, or a different party, e.g. Bob 103*b* or Charlie 103*c*. Similarly, whilst the above description has generally described in terms of Alice 103*a* generating the first primary transaction, the first auxiliary transaction and the second primary transaction, any one or more of those transactions may instead be generated by Bob 103*b* or Charlie 103*c*.

A party, e.g. Bob 103*b* may obtain a primary transaction with the intention of verifying that the primary transaction has been generated correctly. For instance, Bob 103*b* may obtain the second primary transaction from Alice 103*a*. The second primary transaction has been described above. As a brief recap, the second primary transaction has a first output comprising the primary locking script, and a first input (i.e. the unlocking script of the first input) comprising at least the second message (generated based on the second primary transaction), and a first data item comprising one, some, or each locking script of the first primary transaction. One of the locking scripts includes the primary locking script. In the following examples, the first input of the second primary transaction also includes the first auxiliary transaction.

Bob 103*b* verifies that the first primary transaction has been recorded on the blockchain 150 and is therefore a valid transaction. One option to do so is to obtain a Merkle proof (i.e. a set of hashes) that can be used, together with a transaction identifier of the first primary transaction, to compute a candidate block header. If the candidate block header matches a block header of a blockchain block 151, Bob 103*b* can be sure that the block contains the first primary transaction. Another option is to request confirmation from a blockchain node 104.

As discussed above, the unlocking script of the second primary transaction may include the third data item (the midstate of the hash function applied to part of the first primary transaction). Bob 103*b* may use the first data item and the third data item to generate the candidate transaction identifier of the first primary transaction, and perform the Merkle proof using the candidate transaction identifier.

Bob 103*b* also verifies that the primary locking script included in the first primary transaction is correct, in the sense that that the primary locking script is configured to require the first auxiliary transaction to contain the auxiliary locking script. Bob 103*b* may explicitly verify the primary locking script, i.e. check that it contains the correct functions, etc. As a more efficient option, as discussed above, the primary locking script may contain a hash of the auxiliary locking script as part of a hash puzzle. Therefore in order for the hash puzzle to be solved, the auxiliary transaction must include the auxiliary locking script. Therefore Bob 103*b* may verify that the primary locking script includes the hash of the auxiliary locking script. For example, the hash may be known in advance to Bob 103*b*, e.g. sent by Alice 103*a* or the party that generated the initial primary transaction.

As an option check, Bob 103*a* may verify that the second primary transaction contains (e.g. in a second output) the transaction identifier of the initial transaction in the chain of primary transactions, which may be the first primary transaction.

Having performed the verifications, Bob 103*b* may generate a second auxiliary transaction and a third primary transaction. E.g. this may be used to transfer a token to Charlie 103*c*. The second auxiliary transaction takes the same format as the first auxiliary transaction. The second auxiliary transaction has a first input that spends the first output of the second primary transaction, i.e. the output containing the primary locking script. To do so, it includes a third message generated based on some or all fields of the second auxiliary transaction. The second auxiliary transaction has a first input that includes the auxiliary locking script. Bob 103*b* sends the second auxiliary transaction to the blockchain network 106, either directly or via a different party.

Bob 103*b* also generates a third primary transaction. The third primary transaction is similar to the second primary transaction. It includes a first input that spends the first output of the second primary transaction. The first input of the third primary transaction includes a third message generated based on some or all fields of the third primary transaction. In this example, the first input includes the second auxiliary transaction, the first data item (i.e. each locking script of the first primary transaction) and a sixth data item comprises one, some, or each locking script of the second primary transaction. The third primary transaction may include a second output locked to a public key of Charlie 103*c*. The third primary transaction may include a second input that spends the second output of the second primary transaction. Bob 103*b* sends the second primary transaction to the blockchain network 106, either directly or via a different party.

5. Blockchain Node Validated Tokens

This section described a detailed example of the embodiments described above. It should be appreciated that some of the features presented in this section are optional. This example focuses on a use case where the transactions are token transactions, i.e. they contain token-related data. This is merely an illustrate use case and in general it may be used for other applications that require a provable transaction chain without needing to verify all transactions back to issuance.

This section describes a token protocol that meets four requirements.

1. A verifier of a token transaction does not need to trace all the way back to the issuance transaction of the token, thus improving efficiency.
2. After a token is issued, there is no trusted third party involved in the transfer of a token between two users, thus improving security and usability.
3. The size of a token transaction is constant. It is independent of the number of historical transactions, thus improving storage.
4. The solution is not susceptible to replay attacks, i.e., a token cannot be copied, thus improving security.

A token that is enforced in script without the need for a verifier or third party to execute any token rules is known as a 'miner validated' token, or "blockchain node validated" token. This application discloses, to the best of the applicant's knowledge, the first miner validated token protocol on blockchain 150.

The protocol uses the following building blocks:
a script snippet that verifies that the same opcodes appeared in each of the two locking scripts of the grandparent in the transaction chain and that these locking scripts have been executed,
a script snippet that enforces that both of the next child locking scripts in the transaction chain contain the same opcodes,
a script snippet that implements partial SHA256, an auxiliary transaction that passes verification data from one token transaction to its spending transaction (to avoid self-reference), and.

a non-replayable unique token ID (UTID). For simplicity, it is assumed that this is the issuing transaction ID.

The protocol is presented below in steps, describing one part of the solution at a time. Each iteration of the solution creates a problem which will be solved by the next iteration of the solution, finally ending in a complete solution. We take a spending transaction $Tx_{n+1}$ as the viewpoint and explain how we can determine $Tx_{n+1}$ as a valid token transaction without tracing all the way back to an issuance transaction. We use the following terminology to refer to the transactions that are related to $Tx_{n+1}$:

the parent transaction $Tx_n$: the transaction referenced by the second input of $Tx_{n+1}$, the grandparent transaction $Tx_{n-1}$: the transaction referenced by the second input of $Tx_n$; and the auxiliary transaction $Tx_n^A$: the transaction that references the first output of $Tx_n$ in its input and is referenced by the first input of $Tx_{n+1}$.

Figure 4:
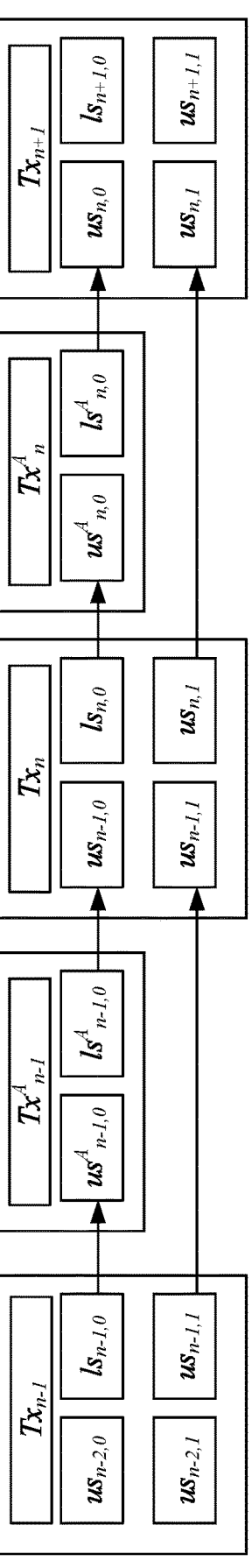
FIG. 4 is a schematic representation of the transaction structure of an example token protocol.

These transactions and their relationships are shown in FIG. 4. We assume that the grandparent, parent, and auxiliary transactions have all been accepted by miners. The spending transaction $Tx_{n+1}$ is the last seen transaction.

5.1 Transaction Structure

The protocol considers the latest three transactions in a token chain. For each transaction there is an auxiliary transaction. The auxiliary transaction is necessary to avoid transaction bloat and self-reference. A schematic representation of the transaction structure is given in FIG. 4, with the transaction chain being defined as a chain of second inputs and outputs. It is explained in more detail below.

In the serialisation of a transaction, all inputs appear first and then all outputs. The inputs and outputs appear in order of their index. The following discussion abstracts away from transaction encoding, focusing on only unlocking and locking scripts. Note that when referring to unlocking scripts, we may also be referring to the outpoint being referenced corresponding to that unlocking script. This is to avoid confusion with the 'input' to a function.

We consider a single chain of transactions such as a representation of a non-fungible token (NFT). We assume that there are no splitting and combining tokens, creating transaction directed acyclic graphs (DAGs). We also assume that there are no other inputs and outputs that can be added.

5.2 Notation

We denote predefined opcodes with an OP prefix OP_CODE and combinations of predefined opcodes without a prefix, for example CODE. An opcode or combinations of opcodes that depend on a variable, such as a public key will be denoted with brackets CODE(PK). We denote the composition of combinations of opcodes as CODE1+CODE2.

5.3 Push Transaction and its Derivatives

The combination of opcodes labelled PUSHTX in a locking script of $Tx_n$ evaluates to TRUE given the sighash preimage $m_{n+1}$ of transaction $Tx_{n+1}$ as input. Under the hood, the opcodes construct and verify a signature on the sighash preimage $m_{n+1}$. The final opcode OP_CHECKSIG evaluates to TRUE if a signature with a corresponding public key is input, where the signature is over the transaction message $m_{n+1}$ extracted from the transaction itself.

The transaction message $m_{n+1}$ is constructed from various fields in $Tx_{n+1}$ and $Tx_n$. In particular, the fields in which we will be interested are:

1. the locking script(s) of $Tx_{n+1}$
2. outpoints $TxID_n$, $TxID_n^A$; and,
3. the locking script of $Tx_n$.

The superscript A indicates that the transaction is an auxiliary transaction.

The implication of including PUSHTX is that the current transaction $Tx_{n+1}$ sighash preimage is provably on the stack. This means that any of these fields can have conditions enforced on them, such as containing certain combinations of opcodes, or serial numbers. If these conditions are unmet, then the spending transaction is not valid.

The combination of opcodes PUSHTXPARENT in a locking script in $Tx_n$ evaluates to TRUE given $Tx_n$ and $TxID_n$ (taken from $m_{n+1}$) as input, if $dSHA256(Tx_n)=TxID_n$ where dSHA256 is the double SHA256 hash function. Under the hood, the opcodes compute the hash of the serialised transaction $Tx_n$ and compare the result to $TxID_n$ where the transaction ID has been extracted from an outpoint in the sighash preimage input to PUSHTX. This evaluates to TRUE if the two values are the same. To ensure that it is indeed the parent transaction of the current transaction that is pushed to the stack, PUSHTXPARENT contains PUSHTX to extract the outpoint from this. Since PUSHTX contains all outpoints, any parent transaction can be pushed, even if it does not correspond to the outpoint of the input it appears in.

The serialised transaction message $Tx_n$ is constructed from various fields. The fields in which we will be especially interested are:

1. the locking script(s) of $Tx_n$; and,
2. the outpoint $TxID_{n-1}$.

The implication of including PUSHTXPARENT in combination with PUSHTX is that any fields in a serialised parent transaction can have conditions enforced on them, as above. Similarly, the combination of opcodes PUSHTXGRANDPARENT in a locking script in $Tx_n$ evaluates to TRUE given $Tx_{n-1}$ and $TxID_{n-1}$ (from $Tx_n$) as input, if $dSHA256(Tx_{n-1})=TxID_{n-1}$. As with PUSHTXPARENT and PUSHTX, $Tx_n$ is the input that is given to PUSHTXPARENT to ensure this is indeed the grandparent transaction. This can be repeated to push any ancestor transaction, provided the link is made iteratively through PUSHTXPARENT, PUSHTXGRANDPARENT, and so on.

5.4 SHA256 Hash Function

A hash function maps data of arbitrary size m to data of fixed size. When the input data is longer than 447 bits, the execution of the SHA256 hash function processes the data iteratively by a compression function $CF(\blacksquare, \blacksquare)$ using the Merkle-Damgård construction. The compression function is used to compute SHA256(m) in the following way.

1. Compute the padded preimage PI=m‖pad, where pad is the padding on the message ensuring the length is a multiple of 512 bits.
2. Split PI into l blocks of size 512 bits with $PI=m_1\|m_2\| \ldots \|m_l$.
3. Compute $mid_1=CF(m_1, IV)$, where IV is a predefined initialisation vector.
4. Compute $mid_2=CF(m_2, mid_1)$.
5. Continue with each jth block of 512 bits $mid_j=CF(m_j, mid_{j-1})$ until the whole preimage is processed.
6. Output $CF(m_l, mid_{l-1})=SHA256(m)$.

The computation of the above steps can be executed up to the jth iteration and halted. The remaining preimage $PPI=m_{j+1}\| \ldots \|m_l$ and the midstate $mid=CF(m_j, mid_{j-1})$ can be stored, and the computation continued later. The further 'partial SHA' computation will be denoted $h=partialSHA256(PPI, mid)$ which outputs the same as SHA256(m).

5.5 Partial SHA256 in Opcodes

The computation of the first jth iterations will be executed off chain. The final $(1-j)$ iterations will be executed in script, requiring an implementation of the computation in opcodes. These opcodes PARTIALSHA256 will return TRUE given h and a remaining preimage PPI and midstate mid as input, if h=partialSHA256(PPI, mid). Under the hood, the opcodes compute the remaining iterations of the SHA256 hash function given PPI and mid as input. The result of this is compared to h. If they are the same, this set of opcodes returns TRUE.

In the present case, we will be computing the partial SHA256 of a serialised transaction which is hashed and compared to a given TxID. As mentioned, the inputs appear first in the serialised transaction. This means that we can use the partial SHA256 computation to redact the first input of a serialised transaction in an unlocking script which is required as an input to PUSHTXPARENT or PUSH-TXGRANDPARENT.

We utilise partial SHA256 to redact the first unlocking script of a serialised transaction. We will abuse the above notation, writing $CF(us_{n,0}, IV)$ to mean the computation of the first j iterations of the SHA256 hash functions, up to the end of the first input. In other words, writing it is in this way does not mean that $us_{n,0}$ is only 512 bits (and the first iteration of the SHA256 hash computation). It will most likely be longer.

5.6. Problem 1: Proof of Execution and Propagation

The first problem we consider is the so-called 'back-to-genesis' problem. This occurs when a validator of a token wants proof that the token transaction they receive is a part of a chain of transactions that lead back to an issuance transaction.

Using PUSHTX on its own enables an issuer to enforce any child transactions to be a certain format, including any of their children, grandchildren, and so on. For example, they may require that a serial number is contained in each future transaction. However, a validator must still explicitly validate every transaction back to the issuance transaction. This increases proof length and validation time with each transfer.

To avoid the need to validate each transaction back to genesis, it could be that a trusted token processor is witness to each transfer. This solves the back-to-genesis problem but reduces usability by introducing a bottleneck in performance and a security risk. It also introduces a communication and infrastructure cost. Additionally, this defeats the purpose of aiming for a miner validated token. A trusted token processor may as well process the whole transfer, removing the script complexity and the cost of PUSHTX.

Figure 5:
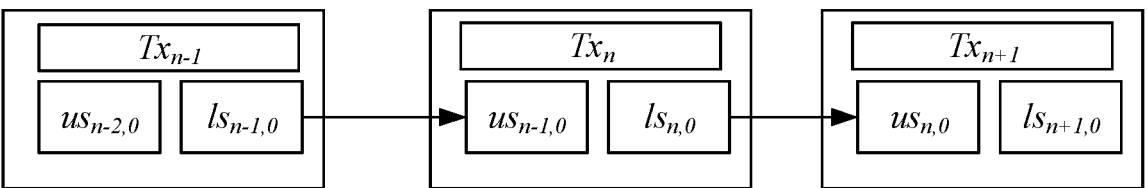
FIG. 5 is a schematic representation of a chain of transactions with one input and one output, FIG. 6 schematically illustrates the transaction bloat problem.

Consider a simple chain of transactions containing one input and one output, as shown in FIG. 5.

We define PROOFOFEXECUTION which evaluates to TRUE given the sighash preimage $m_{n+1}$ as input, if all (in this case one) the locking scripts of $Tx_{n-1}$ and $Tx_n$ are the identical, i.e. the first locking script in $Tx_n$ is the same as the first in $Tx_{n-1}$. We label this proof-of-execution as we want the script snippet to ensure that the same function in opcodes is executed in $ls_n$ and in $ls_{n-1}$. If the locking script contains a variable, such as a public key, it is not expected to stay the same and is ignored. The opcodes PROOFOFEXECUTION include the following:

1. PUSHTX which takes $m_{n+1}$ as input and outputs TRUE, if $m_{n+1}$ is the sighash preimage of the transaction $Tx_{n+1}$.
2. PUSHTXPARENT which takes the outpoint $TxID_n$ from $m_{n+1}$ and $Tx_n$, and outputs TRUE if $Tx_n$ is the hash preimage of $TxID_n$.

3. PUSHTXGRANDPARENT which takes $Tx_{n-1}$ and $TxID_{n-1}$ from $Tx_n$ and outputs TRUE, if $Tx_{n-1}$ is the hash preimage of $TxID_{n-1}$.
4. Opcodes which compare the opcodes in $ls_{n-1}$ from $Tx_{n-1}$ with the opcodes in $ls_n$ from $Tx_n$ and outputs TRUE if the locking script in $Tx_{n-1}$ and $T_n$ contain the same opcodes.
5. Opcodes which ensure there is only one input and one output in the parent and grandparent transaction.

Therefore, a script containing PROOFOFEXECUTION is unlocked by $(m_{n+1}, Tx_n, Tx_{n-1})$. We define PROOFOF-PROPAGATION which evaluates to TRUE given the sighash preimage $m_{n+1}$ as input, if all (in this case one) the locking scripts of $Tx_n$ and $Tx_{n+1}$ are identical i.e. the first locking script in $Tx_n$ is the same as the first in $Tx_{n+1}$, and so on. We label this proof-of-propagation as we want the script snippet to ensure that the same function in opcodes is executed in $ls_n$ and will be executed in $ls_{n+1}$. As with PROOFOFEXECUTION, if the locking script contains a variable, such as a public key, it will be ignored. The opcodes PROOFOFPROPAGATION include the following:

1. PUSHTX which takes $m_{n+1}$ as input and outputs TRUE, if $m_{n+1}$ is the sighash preimage of the transaction $Tx_{n+1}$.
2. PUSHTXPARENT which takes the outpoint $TxID_n$ from $m_{n+1}$ and $Tx_n$, and outputs TRUE if $Tx_n$ is the hash preimage of $TxID_n$.
3. Opcodes which compare the opcodes in $ls_n$ from $Tx_n$ with the opcodes in $ls_{n+1}$ from $m_{n+1}$ and outputs TRUE if the opcodes in the first locking scripts are the same.
4. Opcodes which ensure there is only one input and one output in the child transaction.

Therefore, a script containing PROOFOFPROPAGATION is unlocked by $(m_{n+1}, Tx_n)$.

We define a set of opcodes $\mathcal{S}_1$ as

---

```
PROOFOFPROPAGATION
OP_IF
        PROOFOFEXECUTION
OP_ENDIF
```

--- where PROOFOFEXECUTION is executed if $n\geq3$. We detail exactly how this case is captured later.

If the locking script $ls_n$ in $Tx_n$ for all $n\geq3$ is $\mathcal{S}_1$, then the unlocking script is $us_n=(m_{n+1}, Tx_n, Tx_{n-1})$ where:

$m_{n+1}$=the sighash preimage of $Tx_{n+1}$,
$Tx_n$=the serialised parent transaction; and
$Tx_{n-1}$=the serialised grandparent transaction.

For n=2, the unlocking script is $us_n=(m_2, Tx_1)$. Since $Tx_1$ is issuance, there is no relevant locking script in $Tx_0$. $Tx_1$ is the first transaction that this locking script appears. Note that the combination of opcodes $\mathcal{S}_1$ in $ls_n$ proves that the opcodes $\mathcal{S}_1$ in the locking scripts $ls_n$, are also contained in $ls_{n-1}$, and $ls_{n+1}$.

Both PROOFOFEXECUTION and PROOFOFPROPAGATION look for the presence of $\mathcal{S}_1$, which also contain themselves. In other words, the locking script containing both these sets of opcodes is part of the input to both sets of opcodes.

We prove by induction that $Tx_{n+1}$ must be linked to an issuance transaction $Tx_1$ if it contains the above opcodes.
Proposition:

Consider a set of transactions from $Tx_1$ to $Tx_n$ each with at least one input and one output. Given $Tx_n$ satisfying the following conditions:

one of the inputs of $Tx_n$ spends an output from $Tx_{n-1}$ which contains $\mathcal{S}_1$ in the locking script $ls_n$ as defined above, and $Tx_n$ is accepted by miners, then $Tx_n$ is linked to the issuance transaction $Tx_1$.

Proof:

We prove the claim by induction. When n=2, it is clear that if $Tx_n$ is accepted by miners then it is linked to $Tx_1$, by the outpoint of $Tx_2$.

Base Case n=3:

$Tx_2$ contains a locking script $ls_2=\mathcal{S}_1$, then the unlocking script $us_2=(m_3, Tx_2, Tx_1)$ is in $Tx_3$. If $Tx_3$ is accepted by miners, it must be a grandchild of $Tx_1$ by the spending condition of $\mathcal{S}_1$. Therefore, it is linked to the issuance transaction.

nth Case:

Assume the nth case to be true.

n+1th Case:

Given a transaction $Tx_n$ with an output containing a locking script $ls_n=\mathcal{S}_1$, we prove that a transaction $Tx_{n+1}$ that spends the output with $ls_n$ is linked to an issuance transaction $Tx_1$ through the chain of transactions if $Tx_{n+1}$ is accepted by miners.

If we have the three conditions:

$ls_n=\mathcal{S}_1$, $Tx_{n+1}$ spends that output of $Tx_n$; and, $Tx_{n+1}$ is accepted by miners, then it must be that $us_n=(m_{n+1}, Tx_n, Tx_{n-1})$ in order to unlock the output. Since $ls_n=\mathcal{S}_1$, it must be that $ls_{n-1}=\mathcal{S}_1$ due to PROOFOFEXECUTION and that $ls_{n+1}=\mathcal{S}_1$ due to PROOFOFPROPGATION. Therefore, $Tx_{n-1}$:

contains a locking script $ls_{n-1}=\mathcal{S}_1$ which is spent by $Tx_n$ (the link is required for $us_n$ to spend $ls_n$); and, that that $Tx_n$ is accepted by miners (if $Tx_{n+1}$ is).

Therefore $Tx_n$ is linked to $Tx_1$. We also have that $Tx_{n+1}$ is a child of $Tx_n$ and therefore is linked to $Tx_n$. Therefore, $Tx_{n+1}$ is linked to $Tx_1$.

Figure 6:
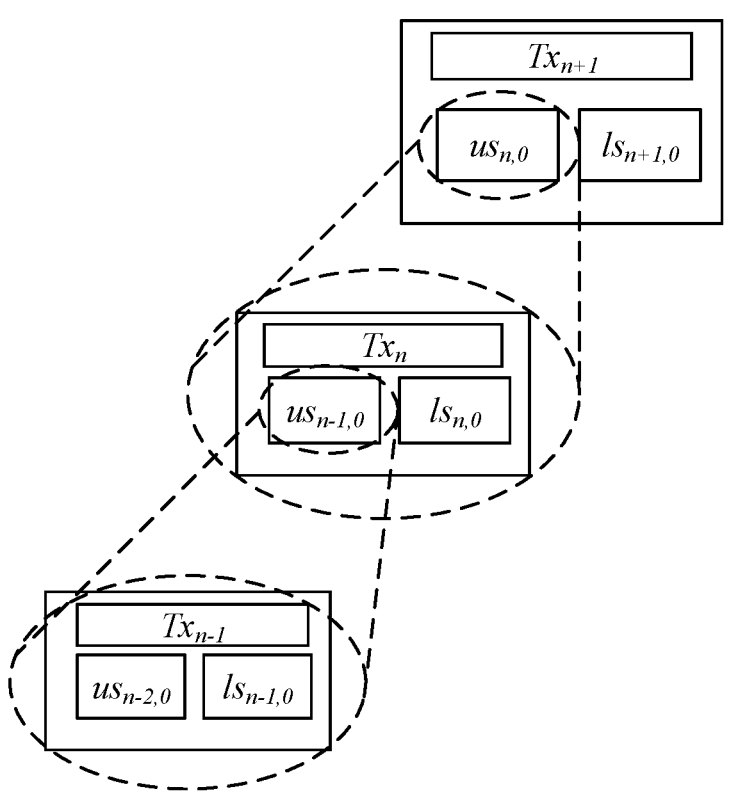

We prove that each transaction in the chain contains all previous transactions, as shown in FIG. 6, creating a transaction bloat problem.

Proposition:

Consider a set of transactions $Tx_1$ to $Tx_n$ that satisfy the claim above. The nth transaction $Tx_n$ contains all transactions back to issuance $Tx_1$.

Proof:

The unlocking script of a transaction $Tx_n$ contains its parent and grandparent transaction, as required by the opcodes $\mathcal{S}_1$ in the locking script of $Tx_{n-1}$. This is true for all $n \geq 3$. Therefore, for a given $Tx_n$, its parent and grandparent also contain their respective parent and grandparent. This is true for each of these transactions and therefore $Tx_n$ contains all transactions back to issuance.

5.7. Problem 2: Partial SHA256 Hash Function

In solving problem 1, we only need $ls_n$ of $Tx_n$, the transaction ID $TxID_{n-1}$ of the outpoint of $Tx_n$, and $ls_{n-1}$ of $Tx_{n-1}$ in the input to $us_n$ from the parent and grandparent transactions to execute PROOFOFPROPAGATION and PROOFOFEXECUTION. No unlocking scripts of the parent and grandparent transactions are needed. We consider how to redact these parts of the transactions.

Figure 7:
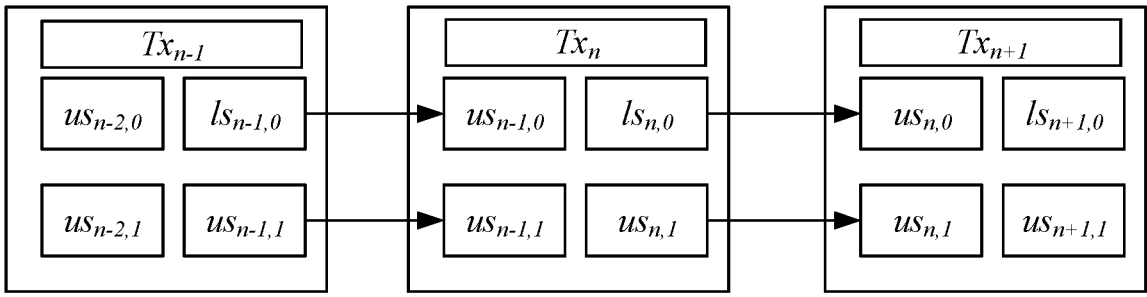
FIG. 7 is a schematic representation of a chain of transactions with two inputs and two outputs.

Consider a chain of transactions, with two inputs and two outputs, as shown in FIG. 7. The additional input and output correspond to a P2PKH(PK) script. We introduce the second input and output to enable the first unlocking script to be redacted and PROOFOFEXECUTION to still be able to utilise the grandparent transaction using the second outpoint.

After describing the following solution, we will show explicitly why the nth transaction no longer contains all transactions back to issuance. At a high level, this is because the unlocking script data is not propagated, which is the part of the transaction that carries information about the previous transactions. We prevent the data being propagated by computing the hash of the transaction (to compare to the TxID) off chain.

We define PUSHTXPARTIALPARENT which evaluates to TRUE, given $TxID_n$ from the second outpoint in $Tx_{n+1}$, and $PPI_n$ and $mid_n$ as input, if $TxID_n = SHA256(partial-SHA256(PPI_n, mid_n))$.

We define PUSHTXPARTIALGRANDPARENT which evaluates to TRUE, given $TxID_{n-1}$ from the second outpoint in $Tx_n$, $PPI_{n-1}$, $mid_{n-1}$ as input, if $TxID_{n-1} = SHA256(partialSHA256(PPI_{n-1}, mid_{n-1}))$.

As described above, the partial SHA256 computation enables the redaction of the first input of the parent and grandparent transactions in these two opcodes, respectively. The inputs $us_{n-1,0}$ and $us_{n-2,0}$ therefore do not appear in $us_{n,0}$. Then $PPI_n$ contains the second unlocking script and both locking scripts of the parent transaction. $PPI_{n-1}$ contains the two locking scripts of the grandparent transaction. The second unlocking script of the parent transaction enables the extraction of the grandparent transaction ID. The locking scripts will be extracted as input to the execution of PROOFOFPROPAGATION and PROOFOFEXECUTION.

We redefine PROOFOFPROPAGATION and PROOFOFEXECUTION to contain PUSHTXPARTIALPARENT and PUSHTXPARTIALGRANDPARENT instead of PUSHTXPARENT and PUSHTXGRANDPARENT, respectively. The redefinition means that the scripts now extract the opcodes in the required locking scripts from $PPI_n$ or $PPI_{n-1}$ instead of $Tx_n$ and $Tx_{n-1}$, as before. Therefore, a script containing PROOFOFEXECUTION is now unlocked by $(m_{n+1}, PPI_n, mid_n, PPI_{n-1}, mid_{n-1})$ and a script containing PROOFOFPROPAGATION is unlocked by $(m_{n+1}, PPI_n, mid_n)$.

Additionally, PROOFOFPROPAGATION and PROOFOFEXECUTION are redefined to contain opcodes which compare opcodes in multiple sets of locking scripts, rather than just one set of locking scripts. As before, it compares the opcodes in the first locking scripts in $Tx_n$ with the opcodes in the first locking script of $Tx_{n+1}$ or $Tx_{n-1}$, respectively. It now also compares the set of second locking scripts in these transactions. These opcodes return TRUE if the first set locking scripts contain the same opcodes and the second set of locking scripts contain the same opcodes. This also implies that rather than checking for one input and output in each transaction, they now ensure there are only two inputs and outputs in each transaction. Any further reference of these opcode refers to these new definitions.

Define a set of opcodes to be $\mathcal{S}_2$ with the redefined opcodes

```
PROOFOFEXECUTION +
OP_IF
    PROOFOFPROPAGATION
OP_ENDIF
```

We define a locking script $ls_{n,0} = \mathcal{S}_2$ to be unlocked with $us_{n,0} = (m_{n+1}, mid_n, PPI_n, mid_{n-1}, PPI_{n-1})$ for all n, where $$m_{n+1} = \text{sighash preimage of } Tx_{n+1},$$

$$mid_n = CF(us_{n-1,0}, IV),$$

$$PPI_n = us_{n-1,1} \| ls_{n,0} \| ls_{n,1} \| pad_n,$$

$$mid_{n-1} = CF(us_{n-2,0} \| us_{n-2,1}, IV),$$

$$PPI_{n-1} = ls_{n-1,0} \| ls_{n-1,1} \| pad_{n-1}.$$

Each unlocking script only ever comprises these five components, which will be proven to have fixed length. The unlocking scripts $us_{n-1,0}$, $us_{n-2,0}$ that would lead to the bloat have been redacted with the partial SHA256 computation.
Proposition:
Let $Tx_n$ be a transaction from the transaction chain defined above with two inputs and two outputs, then the size of $Tx_n$ is less than a constant for all n, i.e. that $len(Tx_n) \leq const$.
Proof:
We simply show that $len(Tx_n)$ doesn't depend on n. In a serialised transaction and sighash preimage, most fields have a well-defined bound on their size.
Sighash Preimage:
Excluding locking and unlocking scripts, we have an upper bound of $$4+32+32+32+4+9+8+4+32+4+4 = 165 \text{ bytes.}$$

Note that because we need to inspect locking scripts in our solution, the final 32 bytes (which is the output of a hash function) will need to be replaced by its preimage. This means that the upper bound, excluding locking scripts is $$4+32+32+32+4+9+8+4+8vout+4+4 = 149 \text{ bytes.}$$

where vout has value 2 in our case. The 9 is a VarInt and so may be anywhere from 1 to 9 bytes. We have excluded the locking script being spent (the parent locking script $ls_{n-1}$) and the locking scripts in the current transaction $ls_{n,vout}$.
Explicitly the unlocking and locking scripts have sizes given in the table below.

where vin and vout are the number of inputs and outputs, respectively, each with value 2. Note that each of the 9 bytes represent a VarInt field. These can be anywhere between 1 and 9 bytes and may be different for each input or output.

Including locking and unlocking scripts, using the table above we have that the serialised transaction has size $len(Tx_n) = 711 + 5len(\mathcal{S}_2) + len(mid_{n-1}) + len(mid_{n-2})$ bytes.

All fields in a transaction $Tx_n$ depend on the length of the script $\mathcal{S}_2$ and the length of the midstate of the parent and grandparent transaction, both of which are constant in length. Therefore, we have an upper bound for the size of a transaction which is independent of n.

Figure 8:
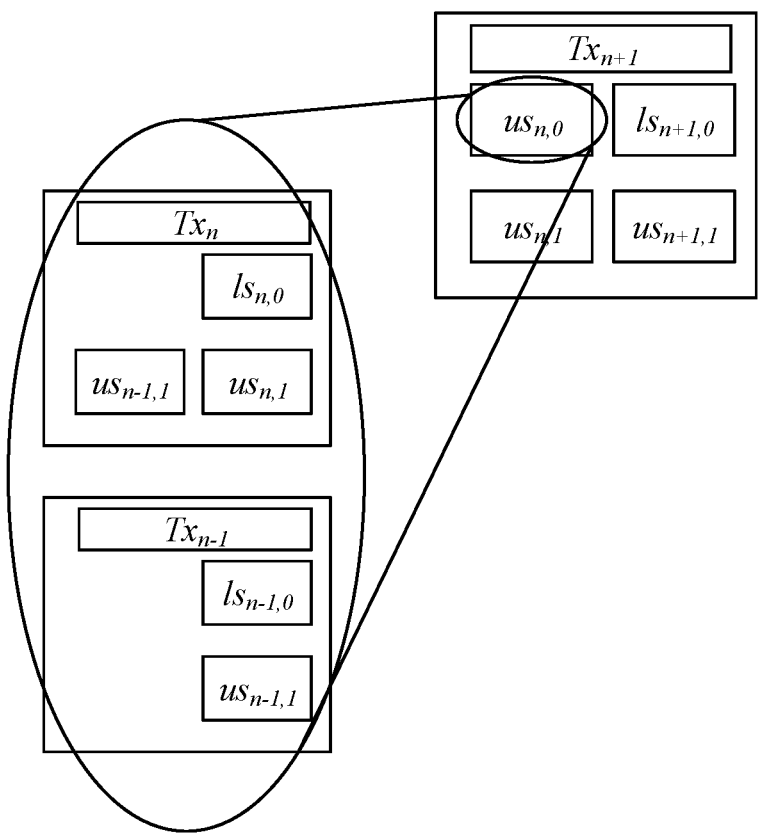
FIG. 8 is a schematic representation showing how the transaction bloat is prevented by the example token protocol, FIG. 9 schematically illustrates an example issuance transaction, FIG. 10 schematically illustrates an example auxiliary transaction, FIG. 11 schematically illustrates an example primary transaction transferring a token from Alice to Bob, FIG. 12 schematically illustrates an example of another auxiliary transaction, FIG. 13 schematically illustrates an example of a primary transaction transferring a token from Bob to Charlie, FIG. 14 schematically illustrates an example format of the nth primary transaction, and FIG. 15 schematically illustrates an example format of the nth auxiliary transaction.

Remark: there is some duplication in the unlocking script with $\mathcal{S}_2$ appearing four times. This may be reduced by taking it once as input and duplicating the data. This would result in a serialised transaction having size $(711 + 2len(\mathcal{S}_2) + len(mid_{n-1}) + len(mid_{n-2}))$ bytes. By redacting the first unlocking script of the parent and grandparent transactions from the current transaction, the nth transaction $Tx_n$ no longer contains all transactions back to issuance $Tx_1$. The first input contains the second unlocking script and two outputs of the two previous transactions only, of which do not contain any information about previous transactions, as shown in FIG. 8.

We note that the outpoints that correspond to $us_{n-1,0}$ and $us_{n-1,1}$ cannot be swapped, since this will reintroduce the transaction bloat problem. The unlocking script $us_{n-1,0}$ that contains the previous transactions must appear first in order to be redacted in $us_{n,0}$.

Whilst we have solved the bloat problem, we have introduced the following self-reference problem. Each round of the compression function processes 64 bytes and must be written in opcodes. The function CF( ) requires more than 64 bytes based on existing opcodes.

The locking script $ls_{n,0}$ comprises multiple compression function rounds, defined as partialSHA256( ) which takes $mid_n$ and $PPI_n$ as an input. This means that the partial-SHA256( ) in opcodes must process $PPI_n$ which contains itself (in opcodes). Consider the best-case scenario where it can be implemented in 65 bytes to illustrate the self-

| Script segment | Subscript segment | Size of subscript segment (bytes) | Total script size (upper bound) |
|---|---|---|---|
| $us_{n-1,0} = \begin{pmatrix} m_n, mid_{n-1}, \\ PPI_{n-1}, mid_{n-2}, \\ PPI_{n-2} \end{pmatrix}$ | $m_n$ | $149 + len(ls_{n-1,0}) + len(ls_{n,0}) + len(ls_{n,1})$ | $392 + 4len(s_2) + len(mid_{n-1}) + len(mid_{n-1})$ |
| | $mid_{n-1}$ | $len(mid_{n-1})$ | |
| | $PPI_{n-1}$ | $32 + 4 + 9 + 4 + len(us_{n-1,1}) + 2(8+9) + len(ls_{n-1,0}) + len(ls_{n-1,1})$ | |
| | $mid_{n-2}$ | $len(mid_{n-2})$ | |
| | $PPI_{n-2}$ | $2(8+9) + len(ls_{n-2,0}) + len(ls_{n-2,1})$ | |
| $us_{n-1,1} = (sig_{n-1}, PK_{n-1})$ | $sig_{n-1}$ | 71 or 72 | 137 |
| | $PK_{n-1}$ | 33 or 65 | |
| $ls_{n,0} = s_2$ | | $len(s_2)$ | $len(s_2)$ |
| $ls_{n,1} = P2PKH(PK_n)$ | | 24 | 24 |

Excluding locking and unlocking scripts, in a serialised transaction, we have an upper bound of $(4+9+9+4+vin(32+4+9+4)+vout(8+9)) = 158$ bytes reference problem. Assume that $PPI_n$ contains only one round of SHA256( ) initially, such that it has a length of 65 bytes.

In order to process the 65 bytes of $PPI_n$, there must be two rounds of SHA256( ) in opcodes in $PPI_n$. Therefore, the length of $PPI_n$ increases to 130 bytes. Now there must be 3 rounds of SHA256( ) in opcodes to process $PPI_n$, meaning $PPI_n$ is actually 195 bytes. We quickly see there is a self-reference problem.

This is not an issue with PUSHTXPARENT since its length does not change depending on the preimage length. The opcode OP_HASH256 can process any length preimage, and still be computed using a single opcode.

5.8. Solution: Auxiliary Transaction

We introduce an auxiliary transaction that spends the first output of $Tx_{n-1}$ and is then referenced by the first input of $Tx_n$, as shown in FIG. 4. The locking script in the auxiliary transaction contains the partial SHA256 hash function in opcodes instead of $Tx_n$. The result of including this transaction is that the partial SHA256 hash function is never used as input to itself.

The set of opcodes PUSHTXAUXILIARY evaluate to TRUE given $m_{n+1}$ and $Tx_n^A$ as input, if $dSHA256(Tx_n^A)=TxID_n^A$ where $TxID_n^A$ is extracted from the first outpoint of $m_{n+1}$.

The opcodes PUSHTXAUXILIARY include the following:

1. PUSHTX which takes $m_{n+1}$ as input and outputs TRUE, if $m_{n+1}$ is the sighash preimage of the transaction $Tx_{n+1}$
2. PUSHTXPARENT which takes $Tx_n^A$ and $TxID_n^A$ from $m_{n+1}$ and outputs TRUE, if $Tx_n^A$ is the hash preimage of $TxID_n^A$ Therefore, a script containing PUSHTXAUXILIARY is unlocked by $(m_{n+1}, Tx_n^A)$.

Define a script $\mathcal{S}_3$ to be

```
PUSHTXAUXILIARY +
PROOFOFPROPAGATION
OP_IF
        PROOFOFEXECUTION
OP_ENDIF
```

A locking script with $ls_n^A = \mathcal{S}_3$ as shown in FIG. 1 is unlocked by $us_{n,0}=(m_{n+1}, Tx_n^A, mid_n, PPI_n, mid_{n-1}, PPI_{n-1})$, where $$m_{n+1} = \text{sighash preimage of } Tx_{n+1},$$

$$Tx_n^A = \text{serialised auxiliary transaction}$$

$$mid_n = partialSHA256(us_{n-1,0}, IV),$$

$$PPI_n = us_{n-1,1}||ls_{n,0}||ls_{n,1}||pad_n,$$

$$mid_{n-1} = partialSHA256(us_{n-2,0}||us_{n-2,1}, IV); \text{ and}$$

$$PPI_{n-1} = ls_{n-1,0}||ls_{n-1,1}||pad_{n-1}.$$

We also define a set of opcodes HASHPUZZLE which evaluate to TRUE, given $ls_n^A$ as input, if $hash(ls_n^A)=hash(\mathcal{S}_3)$, where $hash(\mathcal{S}_3)$ is a fixed constant in HASHPUZZLE.

Define the script $\mathcal{S}_A$ to be:

$$\mathcal{S}_A = PUSHTX + HASHPUZZLE$$

Redefine the locking script $ls_{n,0}$ for all n to be $\mathcal{S}_A$, then the unlocking script is $us_n^A = m_n^A$, where $m_n^A$ is the sighash preimage of $Tx_n^A$.

This locking script enforces that $ls_n^A$ contains the opcodes as defined above. By enforcing that $\mathcal{S}_3$ unlocks the hash puzzle in $ls_{n,0}$, the definitions of PROOFOFEXECUTION and PROOFOFPROPAGATION need not be changed, and the auxiliary transaction has the correct format in each transfer without explicitly checking. All auxiliary transactions are automatically enforced.

Finally, the locking script $ls_{n,1}$ is P2PKH($PK_n$), as before.

The partial SHA256 hash function is never in a partial preimage PPI. It is contained in $ls_n^A$ which is input to OP_HASH256. We have resolved the self-reference problem with no new problems arising.

5.9. Initiating the Protocol

The issuance transaction does not have a grandparent transaction. This introduces a special case which requires a modification to $\mathcal{S}_3$. An issuance transaction may be identified in at least two ways:

1. Validating a signature over the transaction from a public key that is owned by the issuer.
2. Giving each token a unique token ID (UTID).

To avoid introducing specific issuers, we choose the second method where the UTID is defined to be the TxID of the issuance transaction $TxID_1$. Define the opcodes UTIDPRESENT to evaluate to TRUE given $m_{n+1}$ as input, when the UTID in $Tx_{n+1}$ is present in $Tx_n$. Also define the opcodes DEFINEUTID to evaluate to TRUE given $m_{n+1}$ as input, when the UTID in $Tx_n$ and $TxID_{n-1}$ from the second outpoint to $TxID_n$ are equivalent. Note this is only the case when n=2 since $UTID=TxID_1$. This means that the UTID is not present in $Tx_1$. It is instead enforced to be present in the locking script of $Tx_n$ for all n≥2. Also define SAMEOUTPOINT to evaluate to TRUE, given the outpoint to $us_{n,1}$ and the outpoint to $us_n^A$ if they contain the same TxID.

Define a script $\mathcal{S}$ to be

```
PUSHTXAUXILIARY + PROOFOFPROPAGATION +
SAMEOUTPOINT +
UTIDPRESENT
OP_IF
        PROOFOFEXECUTION
OP_ELSE
        DEFINEUTID
OP_ENDIF
```

If UTIDPRESENT is executed and outputs 1 (i.e. when n>2), then the 'if' statement containing PROOFOFPROPAGATION is executed. If UTIDPRESENT is executed and outputs 0 (i.e. when n=2), then the 'else' statement containing DEFINEUTID is executed. Refine the locking script with $ls_n^A = \mathcal{S}$ as shown in FIG. 1 which is unlocked by the unlocking script $us_{n,0}=(m_{n+1}, Tx_n^A, mid_n, PPI_n, mid_{n-1}, PPI_{n-1})$. This along with the other unlocking scripts remain unchanged from the previous unlocking scripts. The only change to locking scripts is:

$ls_{n,0}$ now contains $hash(\mathcal{S})$ instead of $hash(\mathcal{S}_3)$ as the fixed data in the hash puzzle; and, $ls_{n,1}$ which additionally contains OP_RETURN<UTID> at the end.

We note that there is some overlap with the opcodes contained in each set of opcodes, such as PUSHTX and PUSHTXPARTIALPARENT are in both PROOFOFPROPAGATION and PROOFOFEXECUTION. These can utilise the same function and duplicate any required information to improve efficiency.

We enforce that the two outputs $TxID_{n-1}||0$, $TxID_{n-1}||1$ of the parent transaction are spent in the auxiliary transaction and current transaction, respectively. If the outputs are not enforced to be spent in this way, it would be possible to fork the transaction chain and still appear as if the protocol is followed correctly. This may introduce an attack vector where an attacker can easily spend the first output without the second output.

As it stands, it is possible to burn the token by spending the second output without the first as this will lock the output of $Tx_n{}^A$, which must be spent with the second output of $Tx_n$. This cannot be prevented in script without reintroducing the self-reference problem as the auxiliary transaction (which contains the partial SHA256 hash function in opcodes) will be part of the second unlocking script. Therefore, the partial SHA256 hash function would have to process itself in opcodes, which is the self-reference problem. Since a signature is required to spend the second output of $Tx_n$, if a token is burned in this way, a signature will attest to that.

It would also be possible to burn the token by spending the auxiliary transaction in the second output, as it reintroduces the transaction size blow up and the self-reference problem of partial SHA256. However, our solution prevents this by requiring that PROOFOFEXECUTION extract the outpoints from the second outpoint in $m_{n+1}$ only, so that the transaction is only valid if the second outpoint is not the auxiliary transaction.

As mentioned previously, by requiring PROOFOFEXECUTION to extract the outpoints from the second outpoint in $m_{n+1}$, it enforces the outpoint of $Tx_n{}^A$ must be spent with the second outpoint of $Tx_n$. This is because the opcodes in the locking script of $Tx_n{}^A$ return TRUE only if the locking script in $Tx_n$ and $Tx_{n-1}$ contain the same sets of opcodes and the same UTID, which has been defined as the TxID of the issuance transaction. This would only be the case when the second outpoint is the second output of $Tx_n$—any other outpoint will not contain the same opcodes and UTID. Therefore, the output of $Tx_n{}^A$ must be spent with the second output of $Tx_n$, or else it will be invalid.

The script $_S$ is an example of the auxiliary locking script described above. The script $_{S\,A}$ is an example of the primary locking script described above. The sub-script A signifies that the primary locking script enforcing conditions on the auxiliary transaction.

5.10. Token Transfer Protocol

Consider an issuance of a token by issuer I to Alice 103a and then two transfers of the token, first to Bob 103b who transfers to Charlie 103c.

1. The issuer generates $Tx_1$ where $ls_{1,0} = {}_S$ and $ls_{1,1} =$ $P2PKH(PK_A)$ are defined in Section 3.3, paying the token to Alice's public key.
2. Alice generates an auxiliary transaction $Tx_1{}^A$ as defined in Section 3.4 and $Tx_2$ as defined in Section 3.3 and sends these to Bob.
3. Bob validates the transaction using the steps below.
4. Bob generates $Tx_2{}^A$ and $Tx_3{}^A$ and sends to Charlie.
5. Charlie validates the transaction using the steps below.

Further transfers will be executed in the same way as the transfer to Charlie.

5.11. Validator Steps for the nth Transfer

1. Receive transaction $Tx_n$ and the Merkle proof of $Tx_{n-1}$. Compute $TxID_{n-1}$ using data in $Tx_n$ and confirm the Merkle proof is valid.
2. Extract the hash of the auxiliary locking script from the hash puzzle in $Tx_{n-1}$ and verify it corresponds to a well-known hash of this.
3. Extract the UTID and confirm it has been signed, either with a list of valid UTIDs from an issuer, or with a signature on the issuance transaction.

Note that, while there are some steps for a validator to execute, this is similar to any exchange of cash under the hood, such as accepting a note only if it has the correct markings or accepting a blockchain transaction only if it contains a P2PKH to the correct public key. This is a miner validated token as given a transaction that is issued correctly, any transfer must always produce another valid token, with no effort from a validator.

5.12. Detailed Example Protocol

Consider the issuance of a token by issuer I to Alice 103a and then two transfers of the token, first to Bob 103b who transfers to Charlie 103c. Further transfers will be executed in the same way as the transfer to Charlie 103c.

Issuance

1. The issuer generates a transaction spending an arbitrary output requiring their signature, that represents a token as in FIG. 9 and sends this to Alice. The UTID of this token is $TxID_1$. This transaction contains a P2PKH output requiring Alice 103a to unlock the output. The other output enforces that the auxiliary transaction contains the correct function in the output.

Token Transfer

2. Alice 103a generates the auxiliary transaction spending the first output of $Tx_1$ as shown in FIG. 10. This transaction will enforce $_{S\,A}$ and UTID are present in the next transaction and that it is only spent in the same transaction as the P2PKH output from $Tx_1$.
3. To transfer this token to Bob 103b, Alice 103a generates and sends the transaction given in FIG. 11. Bob 103b accepts this if it passes verification (detailed above).
4. Bob generates the auxiliary transaction spending the second output of $Tx_2$ as given in FIG. 12.
5. To transfer this token to Charlie 103c, Bob 103b generates and sends the transaction given in FIG. 13 to Charlie 103c. Charlie 103c accepts this if it passes verification (detailed above).

Further transferred are executed in the same way, with the same format as the transactions in FIGS. 12 and 13.

The general format of the nth token transfer is given in FIG. 14. The auxiliary transaction $Tx_{n-1}{}^A$ is given in FIG. 15.

6. Further Remarks

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In other embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Statement 1. A computer-implemented method of enforcing a locking script to be propagated throughout a chain of blockchain transactions, wherein the method is performed by a first party and comprises:

generating a first primary transaction comprising a first output, wherein the first output comprises a primary locking script, wherein the primary locking script is configured to, when executed by a first unlocking script of a first auxiliary transaction, i) verify that the first unlocking script comprises a first message generated based on the first auxiliary transaction, and ii) verify, based on the first message, that a first output of the first auxiliary transaction comprises an auxiliary locking script, wherein the auxiliary locking script is configured to, when executed by a first unlocking script of a second primary transaction, i) verify that the first unlocking script of the second primary transaction comprises a second message generated based on the second primary transaction, ii) verify that the first unlocking script of the second primary transaction comprises a first data item comprising one or more locking scripts of the first primary transaction, and iii) verify, based on the second message and the first data item, that a first output of the second primary transaction comprises the primary locking script.

Statement 2. The method of statement 1, comprising:

generating the first auxiliary transaction, wherein the first auxiliary transaction comprises a first input referencing the first output of the first primary transaction and comprises the first message, and a first output comprising the auxiliary locking script.

Statement 3. The method of statement 1 or statement 2, wherein the primary locking script comprises a hash of the auxiliary locking script, wherein the first message comprises a candidate auxiliary locking script, and wherein said verifying that the first output of the first auxiliary transaction comprises the auxiliary locking script comprises the primary locking script hashing the candidate auxiliary locking script and verifying that a hash of the candidate auxiliary locking script matches the hash of the auxiliary locking script.

Statement 4. The method of any preceding statement, wherein the first primary transaction comprises a second output, and wherein the auxiliary locking script is configured to, when executed by the first unlocking script of the second primary transaction, iii) verify that the second output of the first primary transaction is unlocked by a second input of the second primary transaction.

Statement 5. The method of statement 4, wherein the auxiliary locking script is configured to, when executed by the first unlocking script of the second primary transaction, iv) verify that the first unlocking script of the second primary transaction comprises a second data item comprising the first auxiliary transaction, and wherein said verifying that the second output is unlocked by the second input of the second primary transaction comprises a) extracting, from the second message, a respective transaction identifier of the second output unlocked by the second input of the second primary transaction, b) extracting, from the second data item, a respective transaction identifier of the first output unlocked by the first input of the first auxiliary transaction, and c) verifying that the respective transaction identifier extracted during step a) matches the respective transaction identifier extracted during step b).

Statement 6. The method of any preceding statement, wherein the first primary transaction has a respective transaction identifier generating by applying a hash function to the first primary transaction, wherein the first unlocking script of the second primary transaction comprises a third data item, wherein the third data item comprises a midstate of the hash function applied to the first primary transaction, and wherein the auxiliary locking script is configured to, when executed by the first unlocking script of the second primary transaction, iv) generate a candidate transaction identifier based on the first data item and the third data item, and verify that the candidate transaction identifier matches the respective transaction identifier of the first primary transaction identifier.

Statement 7. The method of any preceding statement, wherein the auxiliary locking script is configured to when executed by the first unlocking script of the second primary transaction, v) verify that the second primary transaction comprises a specific transaction identifier.

Statement 8. The method of any preceding statement, comprising:

generating the second primary transaction, wherein the second primary transaction comprises a first input that references the first output of the first auxiliary transaction and comprises the second message and the first data item, and wherein the second primary transaction comprises a first output comprising the primary locking script.

Statement 9. The method of any preceding statement, comprising sending the first auxiliary transaction and the second primary second to a second party.

Statement 10. The method of statement 9, comprising sending, to the second party, a Merkle proof for proving that the first primary transaction has been recorded in a block of the blockchain.

Statement 11. The method of any preceding statement, wherein the primary locking script and/or auxiliary locking script comprises data relating to ownership of a token.

Statement 12. The method of any preceding statement, wherein the first primary transaction is an initial primary transaction in the chain of blockchain transactions.

Statement 13. The method of statement 11 and statement 12, wherein the first party is an issuer of the token.

Statement 14. The method of statement 12 or statement 13, when dependent on statement 7, wherein the specific transaction identifier is the respective transaction identifier of the first primary transaction.

Statement 15. The method of any preceding statement, wherein the first primary transaction comprises a first counter value, and wherein the auxiliary locking script is configured to, when executed by the first unlocking script of the second primary transaction, verify that the second primary transaction comprises a second counter value, wherein the second counter value is the iteration of the counter value.

Statement 16. The method of any of statements 1 to 11, wherein the first primary transaction is not the initial transaction in the chain of blockchain transactions, and wherein the first primary transaction comprises a first input referencing a first output of a previous auxiliary transaction that comprises the auxiliary locking script, wherein the previous auxiliary transaction comprises a first input referencing a first output of a previous primary transaction comprising the primary locking script, and wherein the auxiliary locking script is configured to, when executed by the first unlocking script of the second primary transaction, vi) verify that the first unlocking script of the second primary comprises a fourth data item comprising one or more locking scripts of the previous primary transaction, and vii) verify, based on the second message and the fourth data item, that the first output of the second primary transaction comprises the primary locking script.

Statement 17. The method of statement 16, wherein the previous primary transaction has a respective transaction identifier generating by applying a hash function to the previous primary transaction, wherein the first unlocking script of the second primary transaction comprises a fifth data item, wherein the fifth data item comprises a midstate of the hash function applied to the previous primary transaction, and wherein the auxiliary locking script is configured to, when executed by the first unlocking script of the second primary transaction, viii) generate a candidate transaction identifier based on the fourth data item and the fifth data item, and verify that the candidate transaction identifier matches the respective transaction identifier of the previous primary transaction identifier.

Statement 18. The method of statement 16 or statement 17, wherein the previous primary transaction is an initial primary transaction in the chain of blockchain transactions, and wherein the method comprises verifying that the initial primary transaction has been signed with a signature corresponding to a predetermined public key.

Statement 19. The method of any preceding statement, comprising submitting the first primary transaction to the blockchain network.

Statement 20. The method of any preceding statement, comprising submitting the first auxiliary transaction and/or the second primary transaction to the blockchain network.

Statement 21. A computer-implemented method of verifying that a locking script has been enforced throughout a chain of blockchain transactions, wherein the method is performed by a second party and comprises:

obtaining a second primary transaction, wherein the second primary transaction comprises a first input and a first output, wherein the first input comprises a second message generated based on the second primary transaction, a first auxiliary transaction comprising a first input that unlocks a first output of a first primary transaction, and a first data item comprising one or more locking scripts of the first primary transaction, wherein the first output of the first primary transaction comprises a primary locking script and a first output of the first auxiliary transaction comprises an auxiliary locking script, and wherein the first output of the second primary transaction comprises the primary locking script;

verifying that a first primary transaction has been recorded on the blockchain; and verifying that the primary locking script of the first primary transaction is configured to, when executed by a first unlocking script of the first auxiliary transaction, i) verify that the first unlocking script comprises a first message generated based on the first auxiliary transaction, and ii) verify, based on the first message, that a first output of the first auxiliary transaction comprises an auxiliary locking script, wherein the auxiliary locking script is configured to, when executed by a first unlocking script of the second primary transaction, i) verify that the first unlocking script comprises the second message, ii) verify that the first unlocking script comprises the first data item, and iii) verify, based on the second message and the first data item, that the first output of the second primary transaction comprises the primary locking script, thereby verifying that the primary locking script has been enforced throughout the first and second primary transactions.

Statement 22. The method of statement 21, wherein the primary locking script comprises a hash of the auxiliary locking script, wherein the first message comprises a candidate auxiliary locking script, and wherein the primary locking script is configured to, when executed by the first unlocking script of the first auxiliary transaction, verify that the first output of the first auxiliary transaction comprises the auxiliary locking script by hashing the candidate auxiliary locking script and verifying that a hash of the candidate auxiliary locking script matches the hash of the auxiliary locking script, and wherein said verifying the primary locking script is configured to perform steps i) and ii) comprises verifying that the primary locking script comprises the hash of the auxiliary locking script as part of a hash puzzle.

Statement 23. The method of statement 21 or statement 22, said verifying that the first primary transaction has been recorded on the blockchain comprises obtaining a Merkle proof for proving that the first primary transaction has been recorded in a block of the blockchain.

Statement 24. The method of statement 23, wherein the first primary transaction has a respective transaction identifier generating by applying a hash function to the first primary transaction, wherein the first input of the second primary transaction comprises a third data item, wherein the third data item comprises a midstate of the hash function applied to the first primary transaction, and wherein said verifying that the first primary transaction has been recorded on the blockchain comprises generating a candidate transaction identifier based on the first data item and the third data item, and verifying that the Merkle proof is valid for the candidate transaction identifier.

Statement 25. The method of statement 23 or statement 24, comprising obtaining the first primary transaction, and wherein said verification that the first primary transaction has been recorded on the blockchain is based on the obtained Merkle proof and the obtained first primary transaction.

Statement 26. The method of statement 19 or any statement dependent thereon, comprising verifying that the second primary transaction comprises the respective transaction identifier of an initial primary transaction.

Statement 27. The method of statement 19 or any statement dependent thereon, comprising:

generating a second auxiliary transaction, wherein the second auxiliary transaction comprises a first input that references the first output of the second primary transaction and comprises a third message generated based on the second auxiliary transaction, and a first output comprising the auxiliary locking script;

generating a third primary transaction, wherein the third primary transaction comprises a first input that references the first output of the second auxiliary transaction and comprises a fourth message generated based on the third primary transaction, the first data item, the second auxiliary transaction, and a sixth data item comprises one or more locking scripts of the second primary transaction, and wherein the third primary transaction comprises a first output comprising the primary locking script.

Statement 28. The method of statement 27, wherein the auxiliary locking script is configured to, when executed by a first unlocking script of the third primary transaction, vi) verify that the first unlocking script of the second primary comprises the third data item, and vii) verify, based on the third message and the sixth data item, that the first output of the third primary transaction comprises the primary locking script.

Statement 29. The method of statement 27 or statement 28, comprising sending the second auxiliary transaction and the third primary second to a third party.

Statement 30. The method of statement 29, comprising sending, to the third party, a Merkle proof for proving that the second primary transaction has been recorded in a block of the blockchain.

Statement 31. The method of statement 21 or any statement dependent thereon, wherein the primary locking script and/or auxiliary locking script comprises data relating to ownership of a token, and wherein the first primary transaction and/or the first auxiliary locking script has been generated by a token issuer.

Statement 32. The method of statement 27 or any statement dependent thereon, comprising submitting the second auxiliary transaction and the third primary transaction to the blockchain.

Statement 33. Computer equipment comprising:

memory comprising one or more memory units; and processing apparatus comprising one or more processing units, wherein the memory stores code arranged to run on the processing apparatus, the code being configured so as when on the processing apparatus to perform the method of any of statements 1 to 29.

Statement 34. A computer program embodied on computer-readable storage and configured so as, when run on one or more processors, to perform the method of any of statements 1 to 32.

According to another aspect disclosed herein, there may be provided a method comprising the actions of the first party and the second party. According to another aspect disclosed herein, there may be provided a method comprising the actions of a blockchain node configured to process at least the first primary transaction and the first auxiliary transaction.

According to another aspect disclosed herein, there may be provided a system comprising the computer equipment of the first party and the second party. According to another aspect disclosed herein, there may be provided a blockchain node configured to process at least the first primary transaction and the first auxiliary transaction.

The invention claimed is:

1. A computer-implemented method of enforcing a locking script to be propagated throughout a chain of blockchain transactions, wherein the method is performed by computer equipment of a first party and comprises:

generating a first primary blockchain transaction comprising a first output:

generating a primary locking script configured to, when executed by a blockchain node together with a first unlocking script of a first auxiliary blockchain transaction, i) cause the blockchain node to verify that the first unlocking script comprises a first message generated based on the first auxiliary blockchain transaction, and ii) cause the blockchain node to verify, based on the first message, that a first output of the first auxiliary blockchain transaction comprises an auxiliary locking script, wherein the primary locking script is configured so that it cannot be successfully unlocked by the first unlocking script unless each verification passes, wherein the auxiliary locking script is configured to, when executed by a blockchain node together with a first unlocking script of a second primary blockchain transaction, i) cause the blockchain node to verify that the first unlocking script of the second primary blockchain transaction comprises a second message generated based on the second primary blockchain transaction, ii) cause the blockchain node to verify that the first unlocking script of the second primary blockchain transaction comprises a first data item comprising one or more locking scripts of the first primary blockchain transaction, and iii) cause the blockchain node to verify, based on the second message and the first data item, that a first output of the second primary blockchain transaction comprises the primary locking script, wherein the first auxiliary locking script is configured so that it cannot be successfully unlocked by the first unlocking script of the second primary script unless each verification passes, thereby enforcing propagation of the primary locking script through a chain of primary blockchain transactions;

including the primary locking script as part of the first output of the first primary blockchain transaction; and causing the first primary blockchain transaction to be transmitted over an internet connection to one or more blockchain nodes to be stored on the blockchain.

2. The method of claim 1, comprising:

generating the first auxiliary blockchain transaction, wherein the first auxiliary blockchain transaction comprises a first input referencing the first output of the first primary blockchain transaction and comprises the first message, and a first output comprising the auxiliary locking script.

3. The method of claim 1, wherein the primary locking script comprises a cryptographic hash of the auxiliary locking script, wherein the first message comprises a candidate auxiliary locking script, and wherein said verifying that the first output of the first auxiliary transaction comprises the auxiliary locking script comprises the primary locking script causing the blockchain node to generate a cryptographic hash of the candidate auxiliary locking script and verify that the cryptographic hash of the candidate auxiliary locking script matches the cryptographic hash of the auxiliary locking script.

4. The method of claim 1, wherein the first primary blockchain transaction comprises a second output, and wherein the auxiliary locking script is configured to, when executed by the blockchain node together with the first unlocking script of the second primary blockchain transaction, iii) cause the blockchain node to verify that the second output of the first primary blockchain transaction is unlocked by a second input of the second primary blockchain transaction.

5. The method of claim 4, wherein the auxiliary locking script is configured to, when executed by the blockchain node together with the first unlocking script of the second primary blockchain transaction, iv) cause the blockchain node to verify that the first unlocking script of the second primary blockchain transaction comprises a second data item comprising the first auxiliary blockchain transaction, and wherein said verifying that the second output is unlocked by the second input of the second primary blockchain transaction comprises a) extracting, from the second message, a respective transaction identifier of the second output unlocked by the second input of the second primary blockchain transaction, b) extracting, from the second data item, a respective transaction identifier of the first output unlocked by the first input of the first auxiliary blockchain transaction, and c) verifying that the respective transaction identifier extracted during step a) matches the respective transaction identifier extracted during step b).

6. The method of claim 1, wherein the first primary blockchain transaction has a respective transaction identifier generating by applying a cryptographic hash function to the first primary transaction, wherein the first unlocking script of the second primary transaction comprises a third data item, wherein the third data item comprises a midstate of the cryptographic hash function applied to the first primary blockchain transaction, and wherein the auxiliary locking script is configured to, when executed by the blockchain node together with the first unlocking script of the second primary transaction, iv) cause the blockchain node to generate a candidate transaction identifier based on the first data item and the third data item, and verify that the candidate transaction identifier matches the respective transaction identifier of the first primary blockchain transaction identifier.

7. The method of claim 1, wherein the auxiliary locking script is configured to when executed by the blockchain node together with the first unlocking script of the second primary blockchain transaction, v) verify that the second primary blockchain transaction comprises a specific transaction identifier.

8. The method of claim 1, comprising:

generating the second primary blockchain transaction, wherein the second primary blockchain transaction comprises a first input that references the first output of the first auxiliary blockchain transaction and comprises the second message and the first data item, and wherein the second primary transaction comprises a first output comprising the primary locking script.

9. The method of claim 1, comprising sending the first auxiliary blockchain transaction and the second primary second to a second party.

10. The method of claim 1, wherein the primary locking script and/or auxiliary locking script comprises data relating to ownership of a token.

11. The method of claim 1, wherein the first primary blockchain transaction is an initial primary blockchain transaction in the chain of blockchain transactions.

12. The method of claim 11, wherein the auxiliary locking script is configured to when executed by blockchain node together with the first unlocking script of the second primary blockchain transaction, v) verify that the second primary blockchain transaction comprises a specific transaction identifier, and wherein the specific transaction identifier is the respective transaction identifier of the first primary blockchain transaction.

13. The method of claim 1, wherein the first primary blockchain transaction comprises a first counter value, and wherein the auxiliary locking script is configured to, when executed by the blockchain node together with the first unlocking script of the second primary blockchain transaction, verify that the second primary blockchain transaction comprises a second counter value, wherein the second counter value is an iteration of the counter value.

14. The method of claim 1, wherein the first primary blockchain transaction is not an initial blockchain transaction in the chain of blockchain transactions, and wherein the first primary blockchain transaction comprises a first input referencing a first output of a previous auxiliary blockchain transaction that comprises the auxiliary locking script, wherein the previous auxiliary blockchain transaction comprises a first input referencing a first output of a previous primary blockchain transaction comprising the primary locking script, and wherein the auxiliary locking script is configured to, when executed by the blockchain node together with the first unlocking script of the second primary blockchain transaction, vi) verify that the first unlocking script of the second primary blockchain transaction comprises a fourth data item comprising one or more locking scripts of the previous primary blockchain transaction, and vii) verify, based on the second message and the fourth data item, that the first output of the second primary blockchain transaction comprises the primary locking script.

15. The method of claim 14, wherein the previous primary blockchain transaction has a respective transaction identifier generating by applying a cryptographic hash function to the previous primary blockchain transaction, wherein the first unlocking script of the second primary blockchain transaction comprises a fifth data item, wherein the fifth data item comprises a midstate of the cryptographic hash function applied to the previous primary blockchain transaction, and wherein the auxiliary locking script is configured to, when executed by the blockchain node together with the first unlocking script of the second primary blockchain transaction, viii) generate a candidate transaction identifier based on the fourth data item and the fifth data item, and verify that the candidate transaction identifier matches the respective transaction identifier of the previous primary transaction identifier.

16. A computer-implemented method of verifying that a locking script has been enforced throughout a chain of blockchain transactions, wherein the method is performed by computer equipment of a second party and comprises:

obtaining a second primary blockchain transaction, wherein the second primary blockchain transaction comprises a first input and a first output, wherein the first input comprises a second message generated based on the second primary blockchain transaction, a first auxiliary blockchain transaction comprising a first input that configured to unlocks a first output of a first primary blockchain transaction, and a first data item comprising one or more locking scripts of the first primary transaction, wherein the first output of the first primary blockchain transaction comprises a primary locking script and a first output of the first auxiliary blockchain transaction comprises an auxiliary locking script, and wherein the first output of the second primary blockchain transaction comprises the primary locking script;

verifying that a first primary blockchain transaction has been recorded on the blockchain; and verifying that the primary locking script of the first primary blockchain transaction is configured to, when executed by a blockchain node together with a first unlocking script of the first auxiliary transaction, i) cause the blockchain node to verify that the first unlocking script comprises a first message generated based on the first auxiliary blockchain transaction, and ii) cause the blockchain node to verify, based on the first message, that a first output of the first auxiliary transaction comprises an auxiliary locking script, wherein the auxiliary locking script is configured to, when executed by the blockchain node together with a first unlocking script of the second primary blockchain transaction, i) cause the blockchain node to verify that the first unlocking script comprises the second message, ii) cause the blockchain node to verify that the first unlocking script comprises the first data item, and iii) cause the blockchain node to verify, based on the second message and the first data item, that the first output of the second primary blockchain transaction comprises the primary locking script, thereby verifying that the primary locking script has been enforced throughout the first and second primary blockchain transactions.

17. The method of claim 16, wherein the primary locking script comprises a hash of the auxiliary locking script, wherein the first message comprises a candidate auxiliary locking script, and wherein the primary locking script is configured to, when executed by the blockchain node together with the first unlocking script of the first auxiliary blockchain transaction, cause the blockchain node to verify that the first output of the first auxiliary blockchain transaction comprises the auxiliary locking script by hashing the candidate auxiliary locking script and verifying that a hash of the candidate auxiliary locking script matches the hash of the auxiliary locking script, and wherein said verifying the primary locking script is configured to perform steps i) and ii) comprises verifying that the primary locking script comprises the hash of the auxiliary locking script as part of a hash puzzle.

18. The method of claim 16, said verifying that the first primary blockchain transaction has been recorded on the blockchain comprises obtaining a Merkle proof for proving that the first primary blockchain transaction has been recorded in a block of the blockchain.

19. Computer equipment comprising:

memory comprising one or more memory units; and processing apparatus comprising one or more processing units, wherein the memory stores code arranged to run on the processing apparatus, the code being configured so as when run on the processing apparatus, the processing apparatus performs a method of enforcing a locking script to be propagated throughout a chain of blockchain transactions, wherein the method comprises:

generating a first primary blockchain transaction comprising a first output;

generating a primary locking script configured to, when executed by a blockchain node together with a first unlocking script of a first auxiliary blockchain transaction, i) cause the blockchain node to verify that the first unlocking script comprises a first message generated based on the first auxiliary blockchain transaction, and ii) cause the blockchain node to verify, based on the first message, that a first output of the first auxiliary blockchain transaction comprises an auxiliary locking script, wherein the primary locking script is configured so that it cannot be successfully unlocked by the first unlocking script unless each verification passes, wherein the auxiliary locking script is configured to, when executed by a blockchain node together with a first unlocking script of a second primary blockchain transaction, i) cause the blockchain node to verify that the first unlocking script of the second primary blockchain transaction comprises a second message generated based on the second primary blockchain transaction, ii) cause the blockchain node to verify that the first unlocking script of the second primary blockchain transaction comprises a first data item comprising one or more locking scripts of the first primary blockchain transaction, and iii) cause the blockchain node to verify, based on the second message and the first data item, that a first output of the second primary blockchain transaction comprises the primary locking script, wherein the first auxiliary locking script is configured so that it cannot be successfully unlocked by the first unlocking script of the second primary script unless each verification passes, thereby enforcing propagation of the primary locking script through a chain of primary blockchain transactions;

including the primary locking script as part of the first output of the first primary blockchain transaction; and causing the first primary blockchain transaction to be transmitted over an internet connection to one or more blockchain nodes to be stored on the blockchain.

20. A computer program embodied on non-transitory computer-readable storage media and configured so as, when run on one or more processors, the one or more processors perform a method of enforcing a locking script to be propagated throughout a chain of blockchain transactions, wherein the method comprises:

generating a first primary blockchain transaction comprising a first output;

generating a primary locking script configured to, when executed by a blockchain node together with a first unlocking script of a first auxiliary blockchain transaction, i) cause the blockchain node to verify that the first unlocking script comprises a first message generated based on the first auxiliary blockchain transaction, and ii) cause the blockchain node to verify, based on the first message, that a first output of the first auxiliary blockchain transaction comprises an auxiliary locking script, wherein the primary locking script is configured so that it cannot be successfully unlocked by the first unlocking script unless each verification passes, wherein the auxiliary locking script is configured to, when executed by a blockchain node together with a first unlocking script of a second primary blockchain transaction, i) cause the blockchain node to verify that the first unlocking script of the second primary block-chain transaction comprises a second message gener-ated based on the second primary blockchain transac-tion, ii) cause the blockchain node to verify that the first unlocking script of the second primary blockchain transaction comprises a first data item comprising one or more locking scripts of the first primary blockchain transaction, and iii) cause the blockchain node to verify, based on the second message and the first data item, that a first output of the second primary blockchain transaction comprises the primary locking script, wherein the first auxiliary locking script is configured so that it cannot be successfully unlocked by the first unlocking script of the second primary script unless each verification passes, thereby enforcing propagation of the primary locking script through a chain of primary blockchain transactions;

including the primary locking script as part of the first output of the first primary blockchain transaction; and causing the first primary blockchain transaction to be transmitted over an internet connection to one or more blockchain nodes to be stored on the blockchain.

\* \* \* \* \*